United States Patent
Kruse

(10) Patent No.: US 6,535,941 B1
(45) Date of Patent: Mar. 18, 2003

(54) METHOD AND APPARATUS FOR AVOIDING DATA BUS GRANT STARVATION IN A NON-FAIR, PRIORITIZED ARBITER FOR A SPLIT BUS SYSTEM WITH INDEPENDENT ADDRESS AND DATA BUS GRANTS

(75) Inventor: Robert Earl Kruse, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/436,200

(22) Filed: Nov. 8, 1999

(51) Int. Cl.$^7$ .............................................. G06F 13/00
(52) U.S. Cl. ...................... 710/241; 710/113; 710/116
(58) Field of Search ............................... 710/241, 113, 710/116

(56) References Cited

U.S. PATENT DOCUMENTS

| | | | |
|---|---|---|---|
| 4,152,764 A | 5/1979 | Connors et al. | ............ 364/200 |
| 4,484,270 A | 11/1984 | Quernemoen et al. | ...... 364/200 |
| 4,817,037 A | * 3/1989 | Hoffman et al. | ............ 710/110 |

(List continued on next page.)

FOREIGN PATENT DOCUMENTS

| | | | |
|---|---|---|---|
| EP | O911731 A2 | 4/1999 | ............. G06F/9/46 |
| EP | O911736 A1 | 4/1999 | ............ G06F/12/08 |

OTHER PUBLICATIONS

James Peterson, Abraham Silberschatz, Operation Sysem Concepts, 1985, Addison Westley, Inc., 2nd Edition, pp. 120–123.*

James L. Peterson, Abraham Silberschatz, Operating System Concepts, 1985, Addison–Westley, 2nd Edition, pp. 120–122.*

Non–Blocking Distributed Bus Switch For Multicomputer Systems, Research Disclosure Jul. 1998 pp. 1003–1004.

*Primary Examiner*—Peter Wong
*Assistant Examiner*—Justin King
(74) *Attorney, Agent, or Firm*—Duke W. Yee; Robert M. Carwell; Patrick C. R. Holmes

(57) ABSTRACT

A distributed system structure for a large-way, symmetric multiprocessor system using a bus-based cache-coherence protocol is provided. The distributed system structure contains an address switch, multiple memory subsystems, and multiple master devices, either processors, I/O agents, or coherent memory adapters, organized into a set of nodes supported by a node controller. The node controller receives transactions from a master device, communicates with a master device as another master device or as a slave device, and queues transactions received from a master device. Since the achievement of coherency is distributed in time and space, the node controller helps to maintain cache coherency. In order to reduce the delays in giving address bus grants, a bus arbiter for a bus connected to a processor and a particular port of the node controller parks the address bus towards the processor. A history of address bus grants is kept to determine whether any of the previous address bus grants could be used to satisfy an address bus request associated with a data bus request. If one of them qualifies, the data bus grant is given immediately, speeding up the data bus grant process by anywhere from one to many cycles depending on the requests for the address bus from the higher priority node controller.

30 Claims, 17 Drawing Sheets

U.S. PATENT DOCUMENTS

| | | | |
|---|---|---|---|
| 4,862,354 A | 8/1989 | Fiacconi et al. | 364/200 |
| 5,208,914 A | 5/1993 | Wilson et al. | 395/275 |
| 5,325,503 A | 6/1994 | Stevens et al. | 395/425 |
| 5,327,570 A | 7/1994 | Foster et al. | 395/800 |
| 5,335,335 A | 8/1994 | Jackson et al. | 395/425 |
| 5,416,910 A * | 5/1995 | Moyer et al. | 340/825.5 |
| 5,426,765 A | 6/1995 | Stevens et al. | 395/425 |
| 5,440,752 A | 8/1995 | Lentz et al. | 395/800 |
| 5,566,342 A | 10/1996 | Denneau et al. | 395/800 |
| 5,577,204 A | 11/1996 | Brewer et al. | 395/200 |
| 5,583,999 A * | 12/1996 | Sato et al. | 710/100 |
| 5,649,106 A | 7/1997 | Tsujimichi et al. | 395/200 |
| 5,696,913 A | 12/1997 | Gove et al. | 395/311 |
| 5,708,792 A | 1/1998 | Hayes et al. | 395/435 |
| 5,715,430 A | 2/1998 | Hirayama | 395/468 |
| 5,754,800 A * | 5/1998 | Lentz et al. | 710/116 |
| 5,754,877 A | 5/1998 | Hagersten et al. | 395/800 |
| 5,768,609 A | 6/1998 | Gove et al. | 395/800 |
| 5,781,757 A * | 7/1998 | Deshpande | 709/201 |
| 5,794,062 A | 8/1998 | Baxter | 395/800 |
| 5,815,680 A | 9/1998 | Okumura et al. | 395/311 |
| 5,845,096 A * | 12/1998 | Munguia et al. | 710/113 |
| 5,859,975 A | 1/1999 | Brewer et al. | 395/200 |
| 5,890,007 A | 3/1999 | Zinguuzi | 395/800 |
| 5,895,495 A | 4/1999 | Arimilli et al. | 711/156 |
| 5,901,295 A * | 5/1999 | Yazdy | 710/113 |
| 5,931,938 A | 8/1999 | Drogichen et al. | 712/15 |
| 5,938,765 A * | 8/1999 | Dove et al. | 713/1 |
| 6,272,580 B1 * | 8/2001 | Stevens et al. | 710/116 |

* cited by examiner

| EVENT | CONDITION |
|---|---|
| A | $DBR_{MC} = 1$ AND (NOT IN STATE 1203 IN FIGURE 12A) |
| B | $DBG_{MC} = 1$ |

| EVENT | CONDITION |
|---|---|
| A | NO CHANGE |
| B | $ABR_{PROC} = 1$ AND $DBR_{PROC} = 1$ AND (NO CORRESPONDING $ABG_{PROC}$ OR $DBG_{PROC}$) |
| C | $ABR_{PROC} = 1$ AND $DBR_{PROC} = 1$ AND (REQUESTED OR UNREQUESTED $ABG_{PROC}$ PREVIOUSILY GIVEN) |
| D | $ABG_{PROC} = 1$ |
| E | $DBG_{PROC} = 1$ |

| EVENT | CONDITION |
|---|---|
| A | $DBR_{PROC} = 0$ AND $DBR_{MC} = 0$ |
| B | $DBR_{MC} = 1$ AND ((STATE MACHINE 1200 NOT IN STATE 1203) OR (STATE MACHINE 1210 IN STATE 1212)) |
| C | $DBG_{MC} = 1$ |
| D | $DBR_{PROC} = 1$ AND ($DBR_{MC} = 0$ OR ((STATE MACHINE 1200 IN STATE 1203) AND (STATE MACHINE 1210 NOT IN STATE 1212))) |
| E | $DBG_{PROC} = 1$ |

METHOD AND APPARATUS FOR AVOIDING DATA BUS GRANT STARVATION IN A NON-FAIR, PRIORITIZED ARBITER FOR A SPLIT BUS SYSTEM WITH INDEPENDENT ADDRESS AND DATA BUS GRANTS

CROSS-REFERENCE TO RELATED APPLICATIONS

The present invention is related to the following applications entitled "METHOD AND APPARATUS FOR PROVIDING GLOBAL COHERENCE IN A LARGE-WAY, HIGH PERFORMANCE SMP SYSTEM", U.S. application Ser. No. 09/350,032, filed on Jul. 8, 1999; "METHOD AND APPARATUS FOR ACHIEVING CORRECT ORDER AMONG BUS MEMORY TRANSACTIONS IN A PHYSICALLY DISTRIBUTED SMP SYSTEM", U.S. application Ser. No. 09/350,030, filed on Jul. 7, 1999; "METHOD AND APPARATUS USING A DISTRIBUTED SYSTEM STRUCTURE TO SUPPORT BUS-BASED CACHE-COHERENCE PROTOCOLS FOR SYMMETRIC MULTIPROCESSORS", U.S. application Ser. No. 09/350,031, filed on Jul. 8, 1999; "METHOD AND SYSTEM FOR RESOLUTION OF TRANSACTION COLLISIONS TO ACHIEVE GLOBAL COHERENCE IN A DISTRIBUTED SYMMETRIC MULTIPROCESSOR SYSTEM", U.S. application Ser. No. 09/392,833, filed on Sep. 9 1999; "METHOD AND SYSTEM FOR IMPLEMENTING REMSTAT PROTOCOL UNDER INCLUSION AND NON-INCLUSION OF L1 DATA IN L2 CACHE TO PREVENT READ-READ DEADLOCK", U.S. application Ser. No. 09/404,400, filed on Sep. 9, 1999; and "METHOD AND SYSTEM FOR CONTROLLING DATA TRANSFERS WITH PHYSICAL SEPARATION OF DATA FUNCTIONALITY FROM ADDRESS AND CONTROL FUNCTIONALITY IN A DISTRIBUTED MULTI-BUS MULTIPROCESSOR SYSTEM", U.S. application Ser. No. 09/404,280, filed on Sep. 9, 1999, 1999; "METHOD AND APPARATUS TO DISTRIBUTE INTERRUPTS TO MULTIPLE INTERRUPT HANDLERS IN A DISTRIBUTED SYMMETRIC MULTIPROCESSOR SYSTEM", U.S. application Ser. No. 09/436,201, filed on Nov. 8, 1999; "METHOD AND APPARATUS TO ELIMINATE FAILED SNOOPS OF TRANSACTIONS CAUSED BY BUS TIMING CONFLICTS IN A DISTRIBUTED SYMMETRIC MULTIPROCESSOR SYSTEM", U.S. application Ser. No. 09/436,203, filed on Nov. 8, 1999; "METHOD AND APPARATUS FOR TRANSACTION PACING TO REDUCE DESTRUCTIVE INTERFERENCE BETWEEN SUCCESSIVE TRANSACTIONS IN A DISTRIBUTED SYMMETRIC MULTIPROCESSOR SYSTEM", U.S. application Ser. No. 09/436,204, filed on Nov. 8, 1999; "METHOD AND APPARATUS FOR INCREASED PERFORMANCE OF A PARKED DATA BUS IN THE NON-PARKED DIRECTION", U.S. application Ser. No. 09/436,206, filed on Nov. 8, 1999; "METHOD AND APPARATUS FOR FAIR DATA BUS PARKING PROTOCOL WITHOUT DATA BUFFER RESERVATIONS AT THE RECEIVER", U.S. application Ser. No. 09/436,202, filed on Nov. 8, 1999; "METHOD AND APPARATUS FOR SYNCHRONIZING MULTIPLE BUS ARBITERS ON SEPARATE CHIPS TO GIVE SIMULTANEOUS GRANTS FOR THE PURPOSE OF BREAKING LIVELOCKS", U.S. application Ser. No. 09/436,192, filed on Nov. 8, 1999; "METHOD AND APPARATUS FOR TRANSACTION TAG ASSIGNMENT AND MAINTENANCE IN A DISTRIBUTED SYMMETRIC MULTIPROCESSOR SYSTEM", U.S. application Ser. No. 09/436,205, filed on Nov. 8, 1999; "METHOD AND SYSTEM FOR DATA BUS LATENCY REDUCTION USING TRANSFER SIZE PREDICTION FOR SPLIT BUS DESIGNS", U.S. application Ser. No. 09/434,764, filed on Nov. 8, 1999; all of which are assigned to the same assignee.

BACKGROUND OF THE INVENTION

1. Technical Field

The present invention relates generally to an improved data processing system and, in particular, to a method and system for improving data throughput within a data processing system. Specifically, the present invention relates to a method and system for improving performance of input/output processing and bus access regulation.

2. Description of Related Art

Traditionally, symmetric multiprocessors are designed around a common system bus on which all processors and other devices such as memory and I/O are connected by merely making physical contacts to the wires carrying bus signals. This common bus is the pathway for transferring commands and data between devices and also for achieving coherence among the system's cache and memory. A single-common-bus design remains a popular choice for multiprocessor connectivity because of the simplicity of system organization.

This organization also simplifies the task of achieving coherence among the system's caches. A command issued by a device gets broadcast to all other system devices simultaneously and in the same clock cycle that the command is placed on the bus. A bus enforces a fixed ordering on all commands placed on it. This order is agreed upon by all devices in the system since they all observe the same commands. The devices can also agree, without special effort, on the final effect of a sequence of commands. This is a major advantage for a single-bus-based multiprocessor.

A single-common-bus design, however, limits the size of the system unless one opts for lower system performance. The limits of technology typically allow only a few devices to be connected on the bus without compromising the speed at which the bus switches and, therefore, the speed at which the system runs. If more master devices, such as processors and I/O agents, are placed on the bus, the bus must switch at slower speeds, which lowers its available bandwidth. Lower bandwidth may increase queuing delays, which result in lowering the utilization of processors and lowering the system performance.

Another serious shortcoming in a single-bus system is the availability of a single data path for transfer of data. This further aggravates queuing delays and contributes to lowering of system performance. Although a single-system-bus design is the current design choice of preference for implementing coherence protocol, it cannot be employed for a large-way SMP with many processors.

Once a decision is made to design a large-way, distributed multiprocessor system with multiple buses, there are several design challenges for ensuring efficient data transfers. The number of connections to centralized control units can become substantial. Pin count on the physical components becomes a significant limitation, especially in a system that supports a large address space with large data transfers. Hence, it is generally desirable to limit the number of signals so as to limit the number of physically separate pins. In addition, an effort should be made to increase the efficiency of bus arbitration and data transfers so as to decrease the number of dead cycles on the bus.

Therefore, it would be advantageous to have a large-way SMP design using bus-based cache-coherence protocols with efficient bus utilization and data transfers.

SUMMARY OF THE INVENTION

A distributed system structure for a large-way, symmetric multiprocessor system using a bus-based cache-coherence protocol is provided. The distributed system structure contains an address switch, multiple memory subsystems, and multiple master devices, either processors, I/O agents, or coherent memory adapters, organized into a set of nodes supported by a node controller. The node controller receives transactions from a master device, communicates with a master device as another master device or as a slave device, and queues transactions received from a master device. Since the achievement of coherency is distributed in time and space, the node controller helps to maintain cache coherency. In order to reduce the delays in giving address bus grants, a bus arbiter for a bus connected to a processor and a particular port of the node controller parks the address bus towards the processor. A history of address bus grants is kept to determine whether any of the previous address bus grants could be used to satisfy an address bus request associated with a data bus request. If one of them qualifies, the data bus grant is given immediately, speeding up the data bus grant process by anywhere from one to many cycles depending on the requests for the address bus from the higher priority node controller.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
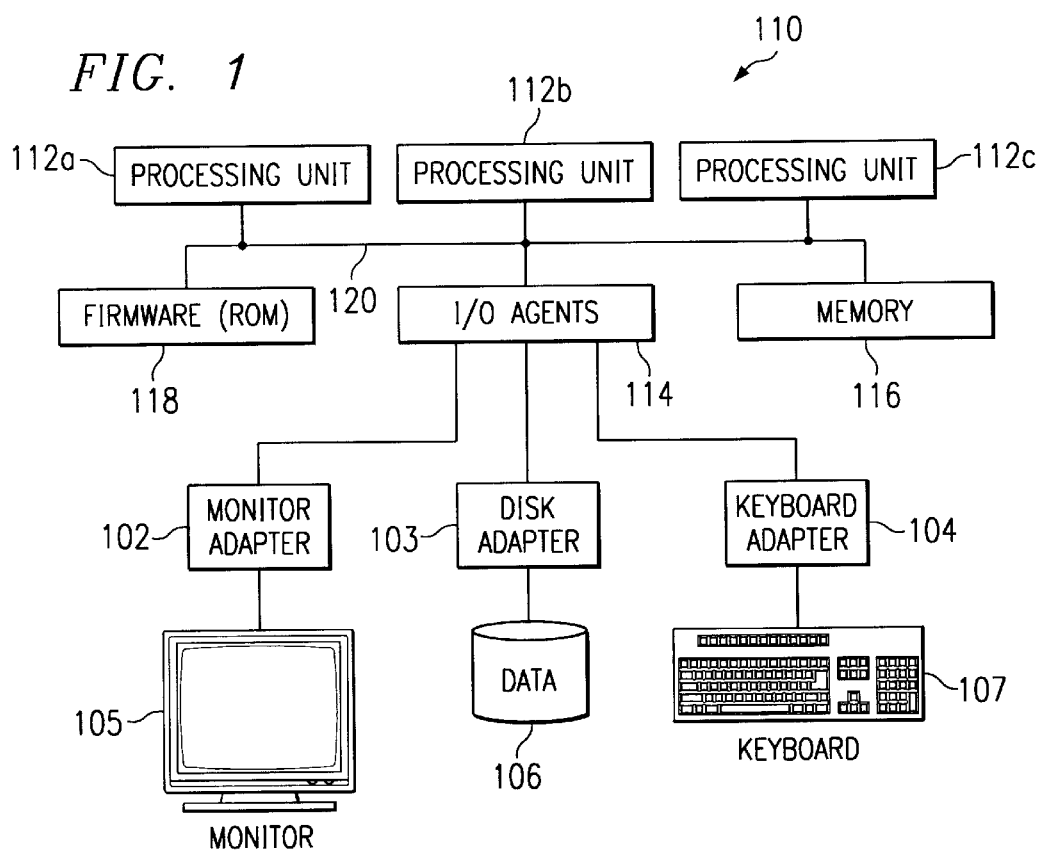
FIG. 1 is a block diagram depicting the basic structure of a conventional multiprocessor computer system.

With reference now to FIG. 1, the basic structure of a conventional multiprocessor computer system 110 is depicted. Computer system 110 has several processing units 112a, 112b, and 112c which are connected to various peripheral devices, including input/output (I/O) agents 114, which accept data from and provide data to a monitor adapter 102 and display monitor 105, keyboard adapter 104 and keyboard 107, and disk adapter 103 and permanent storage device 106, memory device 116 (such as dynamic random access memory or DRAM) that is used by the processing units to carry out program instructions, and firmware 118 whose primary purpose is to seek out and load an operating system from one of the peripherals (usually the permanent memory device) whenever the computer is first turned on. Processing units 112a–112c communicate with the peripheral devices by various means, including a bus 120. Computer system 110 may have many additional components which are not shown, such as serial and parallel ports for connection to peripheral devices, such as modems or printers. Those skilled in the art will further appreciate that there are other components that might be used in conjunction with those shown in the block diagram of FIG. 1; for example, a display adapter might be used to control a video display monitor, a memory controller can be used to access memory 116, etc. In addition, computer system 110 may be configured with more or fewer processors.

In a symmetric multiprocessor (SMP) computer, all of the processing units 112a–112c are generally identical; that is, they all use a common set or subset of instructions and protocols to operate and generally have the same architecture.

Figure 2:
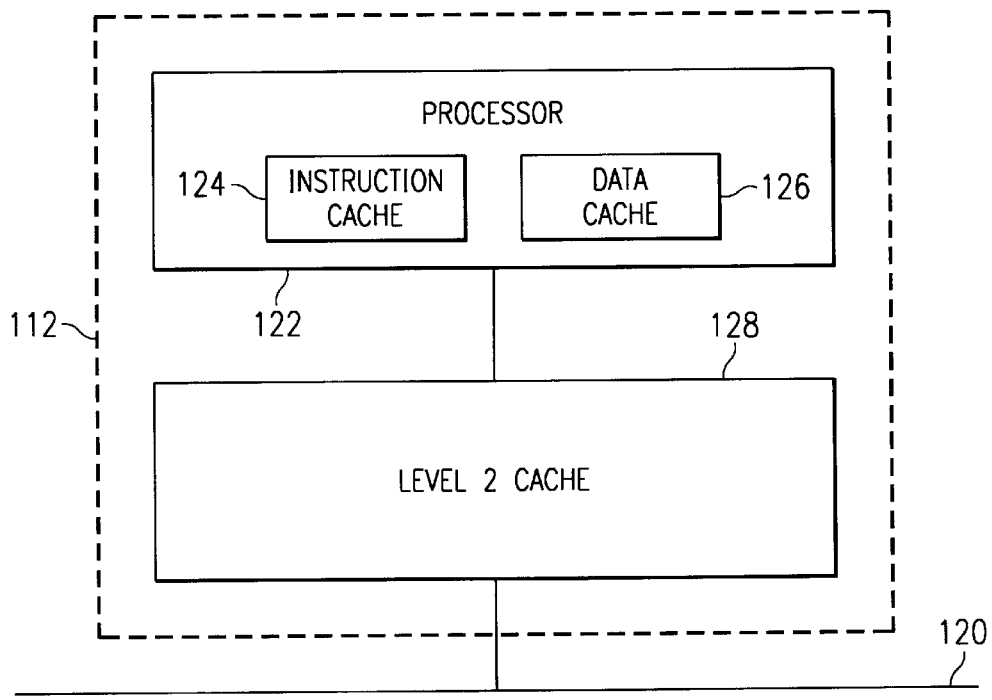
FIG. 2 is a block diagram depicting a typical architecture.

With reference now to FIG. 2, a typical organization is depicted. A processing unit 112 includes a processor 122 having a plurality of registers and execution units, which carry out program instructions in order to operate the computer. The processor can also have caches, such as an instruction cache 124 and a data cache 126. These caches are referred to as "on-board" when they are integrally packaged with the processor's registers and execution units. Caches are commonly used to temporarily store values that might be repeatedly accessed by a processor, in order to speed up processing by avoiding the longer step of loading the values from memory, such as memory 116 shown in FIG. 1.

Processing unit 112 can include additional caches, such as cache 128. Cache 128 is referred to as a level 2 (L2) cache since it supports the on-board (level 1) caches 124 and 126. In other words, cache 128 acts as an intermediary between memory 116 and the on-board caches, and can store a much larger amount of information (instructions and data) than the on-board caches, although at a longer access penalty. For example, cache 128 may be a chip having a storage capacity of 256 or 512 kilobytes, while the processor 112 may be an IBM PowerPC™ 604-series processor having on-board caches with 64 kilobytes of total storage. Cache 128 is connected to bus 120, and all loading of information from memory 116 into processor 112 must come through cache 128. Although FIG. 2 depicts only a two-level cache hierarchy, multi-level cache hierarchies can be provided where there are many levels of serially connected caches.

In an SMP computer, it is important to provide a coherent memory system, that is, to cause writes to each individual memory location to be serialized in some order for all processors. For example, assume a location in memory is modified by a sequence of writes to take on the values 1, 2, 3, 4. In a cache-coherent system, all processors will observe the writes to a given location to take place in the order shown. However, it is possible for a processing element to miss a write to the memory location. A given processing element reading the memory location could see the sequence 1, 3, 4, missing the update to the value 2. A system that ensures that each processor obtains valid data.order is said to be "coherent." It is important to note that virtually all coherency protocols operate only to the granularity of the size of a cache block. That is to say, the coherency protocol controls the movement of the write permissions for data on a cache block basis and not separately for each individual memory location.

There are a number of protocols and techniques for achieving cache coherence that are known to those skilled in the art. At the heart of all these mechanisms for maintaining coherency is the requirement that the protocols allow only one processor to have a "permission" that allows a write to a given memory location (cache block) at any given point in time. As a consequence of this requirement, whenever a processing element attempts to write to a memory location, it must first inform all other processing elements of its desire to write the location and receive permission from all other processing elements to perform the write command. The key issue is that all other processors in the system must be informed of the write command by the initiating processor before the write occurs. To further illustrate how cache coherence is implemented in multi-level hierarchies, consider FIG. 3.

Figure 3:
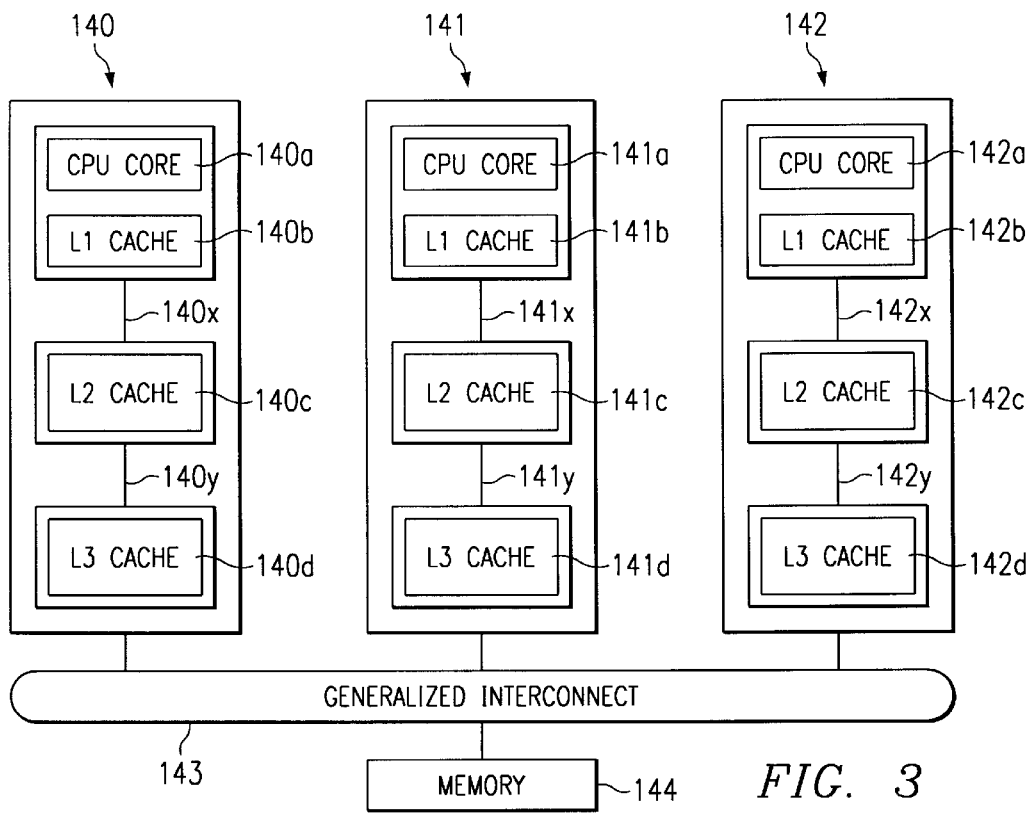
FIG. 3 is a block diagram depicting an SMP computer system with three processing units.

With reference now to FIG. 3, an SMP computer system is depicted with three processing units (140, 141, 142) consisting of processors (140a, 141a, 142a) each having an L1 cache (140b, 141b, 142b), and L2 cache (140c, 141c, 142c), and finally, an L3 cache (140d, 141d, 142d). In this hierarchy, each lower-level cache (i.e., an L3 cache is "lower" than an L2) is typically larger in size and has a longer access time than the next higher-level cache. Furthermore, it is common, although not absolutely required, that the lower-level caches contain copies of all blocks present in the higher-level caches. For example, if a block is present in the L2 cache of a given processing unit, that implies the L3 cache for that processing unit also has a (potentially stale) copy of the block. Furthermore, if a block is present in the L1 cache of a given processing unit, it is also present in the L2 and L3 caches of that processing unit. This property is known as inclusion and is well-known to those skilled in the art. Henceforth, it is assumed that the principle of inclusion applies to the cache related to the present invention.

To implement cache coherency in a system such as is shown in FIG. 3, the processors communicate over a common generalized interconnect (143). The processors pass messages over the interconnect indicating their desire to read or write memory locations. When an operation is placed on the interconnect, all of the other processors "snoop" this operation and decide if the state of their caches can allow the requested operation to proceed and, if so, under what conditions. This communication is necessary because, in systems with caches, the most recent valid copy of a given block of memory may have moved from the system memory 144 to one or more of the caches in the system. If a processor (say 140a) attempts to access a memory location not present within its cache hierarchy (140b, 140c and 140d), the correct version of the block, which contains the actual value for the memory location, may either be in the system memory 144 or in one of the caches in processing units 141 and 142. If the correct version is in one of the other caches in the system, it is necessary to obtain the correct value from the cache in the system instead of system memory.

For example, consider a processor, say 140a, attempting to read a location in memory. It first polls its own L1 cache (140b). If the block is not present in the L1 cache (140b), the request is forwarded to the L2 cache (140c). If the block is not present in the L2 cache, the request is forwarded on to the L3 cache (140d). If the block is not present in the L3 cache (140d), the request is then presented on the generalized interconnect (143) to be serviced. Once an operation has been placed on the generalized interconnect, all other processing units "snoop" the operation and determine if the block is present in their caches. If a given processing unit, say 142, has the block of data requested by processing unit 140 in its L1 cache (142a), and the data is modified, by the principle of inclusion, the L2 cache (142c) and the L3 cache (142d) also have copies of the block. Therefore, when the L3 cache (142d) of processing unit 142 snoops the read operation, it will determine that the block requested is present and modified in the L3 cache (142d). When this occurs, the L3 cache (142d) may place a message on the generalized interconnect informing processing unit 140 that it must "retry" its operation again at a later time because the most recently updated value of the memory location for the read operation is in the L3 cache (142d), which is outside of main memory 144, and actions must be taken to make it available to service the read request of processing unit 140.

The L3 cache (142d) may begin a process to push the modified data from the L3 cache to main memory 144. The most recently updated value for the memory location has then been made available to the other processors.

Alternatively, in a process called "intervention," the L3 cache (142d) may send the most recently updated value for the memory location directly to processing unit 140, which requested it. The L3 cache may then begin a process to push the modified data from the L3 cache to main memory. Processing unit 140, specifically its L3 cache (140d), eventually represents the read request on the generalized interconnect. At this point, however, the modified data has been retrieved from the L1 cache of processing unit 142 and the read request from processor 140 will be satisfied. The scenario just described is commonly referred to as a "snoop push." A read request is snooped on the generalized interconnect which causes processing unit 142 to "push" the block to the bottom of the hierarchy to satisfy the read request made by processing unit 140.

The key point to note is that, when a processor wishes to read or write a block, it must communicate that desire with the other processing units in the system in order to maintain cache coherence. To achieve this, the cache-coherence protocol associates, with each block in each level of the cache hierarchy, a status indicator indicating the current "state" of the block. The state information is used to allow certain optimizations in the coherency protocol that reduce message traffic on generalized interconnect 143 and inter-cache connections 140x, 140y, 141x, 141y, 142x, 142y. As one example of this mechanism, when a processing unit executes a read, it receives a message indicating whether or not the read must be retried later. If the read operation is not retried, the message usually also includes information allowing the processing unit to determine if any other processing unit also has a still active copy of the block (this is accomplished by having the other lowest-level caches give a "shared" or "not shared" indication for any read they do not retry).

In this manner, a processing unit can determine whether any other processor in the system has a copy of the block. If no other processing unit has an active copy of the block, the reading processing unit marks the state of the block as "exclusive." If a block is marked exclusive, it is permissible to allow the processing unit to later write the block without first communicating with other processing units in the system because no other processing unit has a copy of the block. Therefore, in general, it is possible for a processor to read or write a location without first communicating this intention onto the interconnection. However, this only occurs in cases where the coherency protocol has ensured that no other processor has an interest in the block. Several details of the exact workings of a multi-level cache coherence protocol have been omitted in this discussion to simplify it. However, the essential aspects that bear on the invention have been described. Those aspects that bear on the invention have been described. Those aspects not described are well-known to those skilled in the art.

Another aspect of multi-level cache structures relevant to the invention are the operations known as deallocations. The blocks in any cache are divided into groups of blocks called "sets". A set is the collection of blocks in which a given memory block can reside. For any given memory block, there is a unique set in the cache that the block can be mapped into, according to preset mapping functions. The number of blocks in a set is referred to as the associativity of the cache (e.g., 2-way set associative means that, for any given memory block, there are two blocks in the cache that the memory block can be mapped into). However, several different blocks in main memory can be mapped to any given set.

When all of the blocks in a set for a given cache are full and that cache receives a request, whether a read or write, to a memory location that maps into the full set, the cache must "deallocate" one of the blocks currently in the set. The cache chooses a block to be evicted by one of a number of means known to those skilled in the art (least recently used (LRU), random, pseudo-LRU, etc.). If the data in the chosen block is modified, that data is written to the next lowest level in the memory hierarchy, which may be another cache (in the case of the L1 or L2 cache) or main memory (in the case of an L3 cache). Note that, by the principle of inclusion, the lower level of the hierarchy will already have a block available to hold the written modified data. However, if the data in the chosen block is not modified, the block is simply abandoned and not written to the next lowest level in the hierarchy. This process of removing a block from one level of the hierarchy is known as an "eviction." At the end of this process, the cache no longer holds a copy of the evicted block and no longer actively participates in the coherency protocol for the evicted block because, when the cache snoops an operation (either on generalized interconnect 143 or inter-cache connections 140x, 141x, 142x, 140y, 141y, 142y), the block will not be found in the cache.

The present invention discloses a distributed hardware structure to overcome the limitations of a single common bus in a multiprocessor system while utilizing the properties of the single bus so that it does not require a modification to the bus protocol. The resulting system has a scalable system size without compromising the mechanism of a known system bus. The present invention is able to connect together a large number of devices in an SMP system and overcome the limitations of a single-bus-based design.

Although the following description describes the invention with respect to the 6xx bus architecture, the present invention is not intended to be limited to a particular bus architecture as the system presented below can be applied to other bus architectures.

System Address Path Topology

Figure 4:
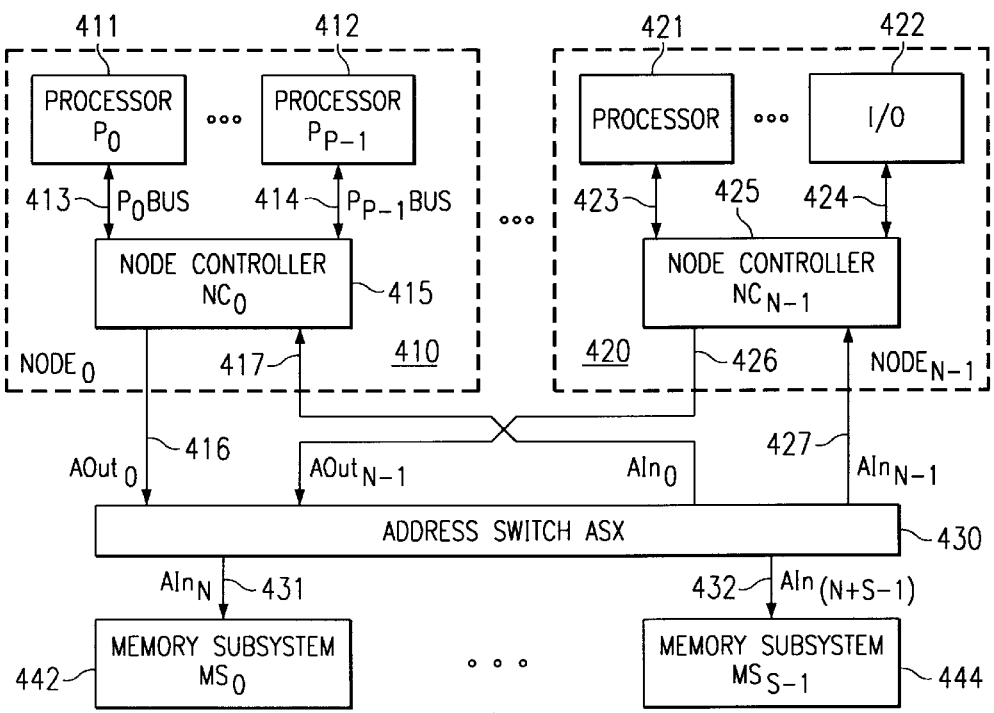
FIG. 4 is a block diagram depicting a distributed system structure for a symmetric multiprocessor system with supporting bus-based cache-coherence protocol from the perspective of address paths within the SMP system.

With reference now to FIG. 4, a block diagram depicts a distributed system structure for a symmetric multiprocessor system with supporting bus-based cache-coherence protocol from the perspective of address paths within the SMP system. FIG. 4 displays a number of master devices that can initiate a command, such as a memory transaction. These master devices, such as processors, I/O agents, and coherent memory adapters, are distributed in clusters among a number of N groups called nodes. Each node is headed by a node controller into which its masters connect.

FIG. 4 shows nodes 410 and 420, which contain groupings of system elements. The number of nodes may vary based on the configuration of the system. Node 410, also labeled as $Node_0$, contains processors 411 and 412, also labeled as Processor $P_0$ and Processor $P_{P-1}$, which are the masters for Node 410. Each node controller has multiple standard bidirectional processor address-data buses over which masters are connected into the distributed system. Processors 411 and 412 connect to node controller 415, also labeled as Node Controller $NC_0$, via buses 413 and 414, also labeled as $P_0$Bus and $P_{P-1}$Bus, respectively. Node 420, also labeled as $Node_{N-1}$, contains processor 421 and I/O agent 422, which are the masters for Node 420. Processor 421 and I/O device 422 connect to node controller 425, also labeled as Node Controller $NC_{N-1}$ via buses 423 and 424, respectively. The number of masters per node may vary depending upon the configuration of the system, and the number of masters at each node is not required to be uniform across all of the nodes in the system.

The node controller constitutes the physical interface between a master and the rest of the system, and each node controller in the system contains all of the necessary logic to arbitrate for individual processor buses and to communicate with its local masters as another master or as a slave, i.e. a device that accepts master commands and executes them but does not generate master commands. A processor sends a command into the system via its local node controller. Although FIG. 4 shows one master per port, multiple masters per port are possible given an appropriate arbitration scheme on the bus of that port. For example, processor 411 could be one of many processors connected to bus 413. However, if more processors are connected to a single port, then their address bus will perform more slowly in terms of bus cycle time.

Alternatively, one of the masters of Node 420 may include a coherent memory adapter that provides communication with another data processing system that maintains cache coherence. The coherent memory adapter may be proximate or remote and may occupy a port of a node controller to send and receive memory transactions in order to behave as a master/slave device in a manner similar to an I/O agent. As one example, another node controller from another data processing system may also be connected to the coherent memory adapter so that data processing systems that employ the present invention may be chained together.

Node controllers 415 and 425 are connected to a device called an address switch (ASX) via pairs of unidirectional address-only buses. Buses 416 and 417, also labeled $AOut_0$ and $AIn_0$, respectively, connect node controller 415 to address switch 430. Buses 426 and 427, also labeled AOut$_{N-1}$ and AIn$_{N-1}$, respectively, connect node controller 425 to address switch 430. As shown, buses AOut$_X$ carry addresses from the node controllers to the address switch, and buses AIn$_X$ carry addresses from the address switch to the node controllers.

Address switch 430 has additional unidirectional address bus connections 431 and 432, also labeled as AIn$_N$ and AIn$_{(N+S-1)}$, to memory controllers or memory subsystems 442 and 444, also labeled as memory subsystem MS$_0$ and MS$_{N-1}$. The memory controllers are assumed to be slave devices and have no ability to issue commands into the distributed system. The number of memory subsystems may vary depending upon the configuration of the system.

System Data Path Topology

Figure 5:
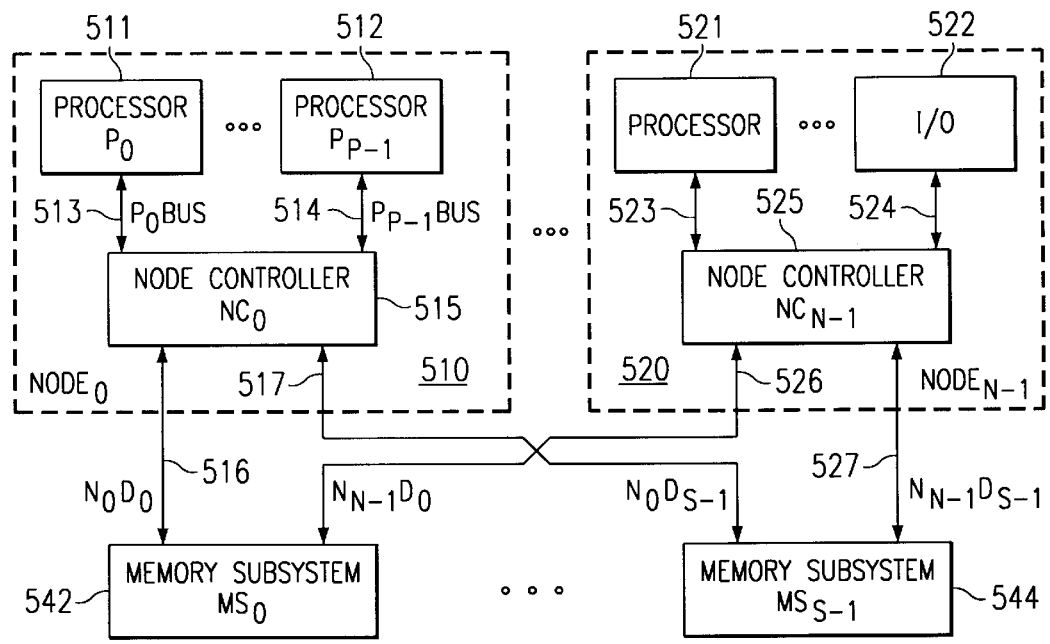
FIG. 5 is a block diagram depicting a distributed system structure for a symmetric multiprocessor system with supporting bus-based cache-coherence protocol from the perspective of data paths within the SMP system.

With reference now to FIG. 5, a block diagram depicts a distributed system structure for a symmetric multiprocessor system with supporting bus-based cache-coherence protocol from the perspective of data paths within the SMP system. In a manner similar to FIG. 4, FIG. 5 displays a number of master devices. These master devices are distributed in clusters among a number of N groups called nodes. Each node is headed by a node controller into which its masters connect. FIG. 5 shows nodes 510 and 520 containing processors 511 and 512. Processors 511 and 512 connect to node controller 515 via buses 513 and 514. Node 520, also labeled as Node$_{N-1}$, contains processor 521 and I/O device 522 that connect to node controller 525, also labeled as Node Controller NC$_{N-1}$ via buses 523 and 524, respectively.

The node controllers shown in FIG. 4 and FIG. 5 could be physically the same system component but are described from different perspectives to show different functionality performed by the node controllers. Whereas FIG. 4 shows address paths within the SMP system, FIG. 5 shows the data paths within the SMP system. Alternatively, in a preferred embodiment, the address paths and data paths may be implemented with supporting functionality in physically separate components, chips, or circuitry, such as a node data controller or a node address controller. The choice of implementing a node controller with separate or combined data and address functionality may depend upon parameters of other system components. For example, if the sizes of the buses supported within the system are small enough, both address and data functionality may be placed within a single node controller component. However, if the buses support 128 bits of data, then pin limitations may physically require the address and data functionality to be placed within separate node controller components.

Alternatively, a separate node data controller may be further separated into multiple node data controllers per node so that each node data controller provides support for a portion of the node's data path. In this manner, the node's data path is sliced across more than one node data controller.

In FIG. 5, each node controller is shown connected to a plurality of memory controllers, such as memory subsystems MS$_0$ and MS$_{S-1}$. Although each node controller is shown to connect to each memory controller via an independent data bus, multiple nodes and/or multiple memory controllers may be connected on the same data bus if an appropriate arbitration mechanism is included. As with connecting a plurality of master devices to a single node controller via a single bus, the switching rate will be a function of the number of devices connected to the bus. Node controller 515 connects to memory subsystem 542 via data bus 516, and to memory subsystem 544 via bus 517, also labeled as N$_0$D$_0$ and N$_0$D$_{S-1}$, respectively. Node controller 525 connects to memory subsystem 544 via data bus 527, and to memory subsystem 542 via data bus 526, also labeled as N$_{N-1}$D$_{S-1}$ and N$_{N-1}$D$_0$, respectively.

Instead of a single data bus that transfers data belonging to all of the masters, there are multiple data buses, each of which carries only a small portion of the data traffic that would be carried if the masters were connected to a single bus. In so doing, the component interfaces may be clocked faster than would be possible with a single bus. This configuration permits the allocation of more data bus bandwidth per master than would be possible on a single bus, leading to lower queueing delays.

Node Controller Internal Address Paths

Figure 6:
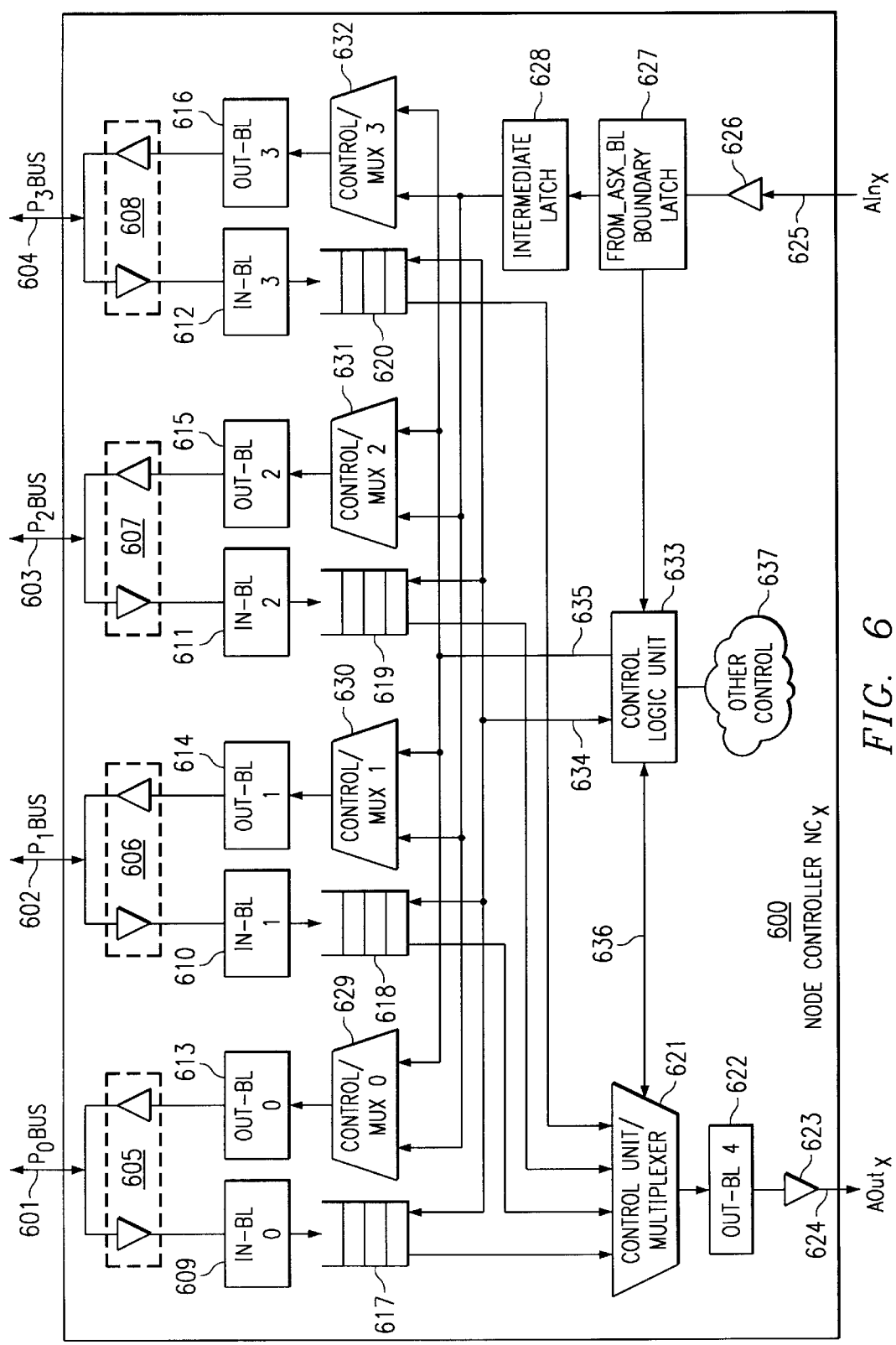
FIG. 6 is a block diagram depicting the address paths internal to a node controller.

With reference now to FIG. 6, a block diagram depicts the address paths internal to a node controller. Node controller 600, also labeled NC$_X$, is similar to node controllers 415 and 425 in FIG. 4 or node controllers 515 and 525 in FIG. 5. Individual ports of node controller 600 have their own queues to buffer commands from masters as the commands enter the node controller. A command may incur non-deterministic delay while waiting in these buffers for progressive selection toward the address switch.

Node controller 600 has bidirectional buses 601–604 that connect to master devices. Buses 601–604 connect to input boundary latches 609–612 and output boundary latches 613–616 via bus transceivers 605–608. Input boundary latches 609–612 feed buffers 617–620 that hold the commands from the master devices. A command from a master device may consist of a transaction tag, transaction type, target or source address, and other possible related information. Buffers 617–620 may hold all information related to a command, if necessary, or may alternatively hold only the information necessary for the functioning of the address path within the node controller. The information held by the input buffers may vary depending on alternative configurations of a node controller. Buffers 617–620 feed control unit/multiplexer 621 that selects one command at a time to send to the address switch via latch 622, transmitter 623, and bus 624, also labeled AOut$_X$.

Node controller 600 receives commands from masters via buses 601–604 for eventual transmittal through boundary latch 622 and transmitter 623 to the address switch via bus 624, also labeled bus AOut$_X$. In a corresponding manner, node controller 600 accepts commands from the address switch via bus 625, also labeled bus AIn$_X$, and receiver 626 for capture in boundary latch 627, also labeled as FROM_ASX_BL. These commands follow an address path through a fixed number of latches that have a fixed delay, such as intermediate latch 628 and output boundary latches 613–616, before reaching buses 601–604. In addition, commands to master devices also pass through a multiplexer per port, such as control units/multiplexers 629–632, that also have a fixed delay. In this manner, commands arriving via bus 625 traverse a path with a fixed delay of a deterministic number of cycles along the path. In other words, a fixed period of time occurs between the point when a command reaches latch FROM_ASX_BL to the point at which each master device, such as a set of processors connected to the node controller, is presented with the arriving command.

The arbiters for the ports connected to the masters are designed to give highest priority to the node controllers driving the port buses. If a master makes a request to drive a bus at the same time that the node controller expects to drive it, the node controller is given highest priority. In a preferred embodiment, to assist with this arbitration scenario, a signal called "SnoopValid" (not shown) is asserted by the address switch ahead of the command being sent by the address switch. This allows the arbitration for the bus accesses between a node controller and its masters to be completed early enough to ensure that a command arriving from the address switch via the $AIn_X$ bus does not stall for even one cycle while inside the node controller. This guarantees that the time period for the fixed number of latches along the $AIn_X$-to-$P_X$Bus paths actually resolve to a deterministic number of cycles.

Control logic unit 633 is also presented with the incoming command latched into the FROM_ASX_BL latch for appropriate determination of control signals to other units or components within node controller 600. For example, control logic unit 633 communicates with buffers 617–620 via control signals 634, control unit/multiplexer 621 via control signals 636, and control units/multiplexers 629–632 via control signals 635 to select commands, resolve collisions, and modify fields of commands, including a command's type if necessary, in order to ensure the continuous flow of commands within node controller 600. Control logic unit 633 also receives other control signals 637, as appropriate.

Address Switch Internal Address Paths

Figure 7:
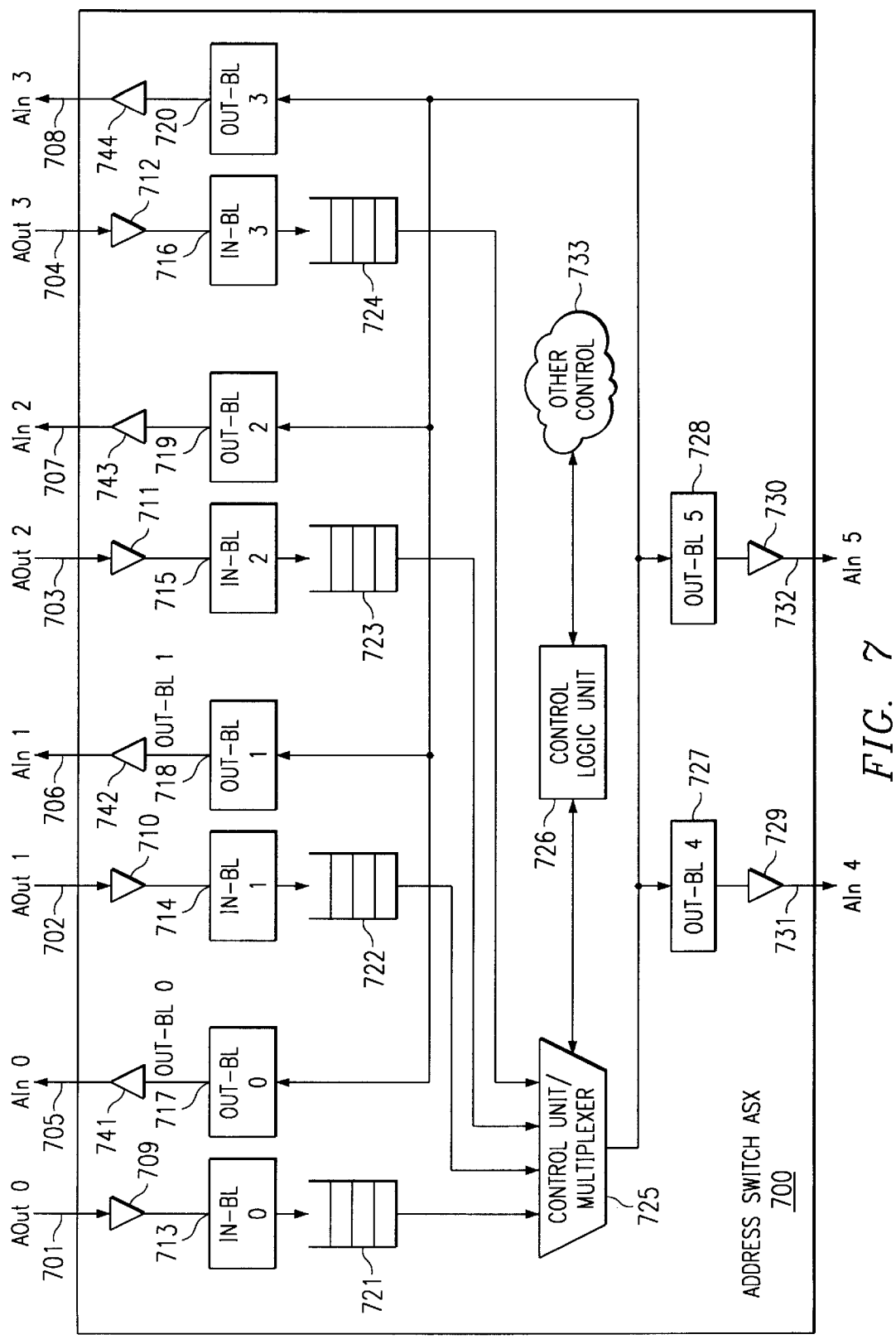
FIG. 7 is a diagram depicting the internal address paths of an address switch connecting node controllers and memory subsystems.

With reference now to FIG. 7, a diagram depicts the internal address paths of an address switch connecting node controllers and memory subsystems. Address switch 700 connects a set of four node controllers and two memory subsystems. Commands arrive at first-in first-out (FIFO) queues 721–724 from buses 701–704, also labeled $AOut_0$–$AOut_3$, via receivers 709–712 and input boundary latches 713–716. These commands may reside within a FIFO before being selected by control unit/multiplexer 725. A command may experience a finite but non-deterministic number of cycles of delays while sitting in the FIFO. Control logic unit 726 may communicate with control unit/multiplexer 725 and FIFOs 721–724 in order to determine the selection of incoming commands. Control logic unit 726 also receives other control signals 733, as appropriate.

Control unit/multiplexer 725 selects one command at a time to be broadcast to the node controllers and memory subsystems over paths that are deterministic in terms of the number of cycles of delay. In the example shown in FIG. 7, commands are sent to the memory subsystems via unidirectional buses 731 and 732, also labeled as buses $AIn_4$ and $AIn_5$, through output boundary latches 727 and 728 and transmitters 729 and 730. Commands are sent to node controllers via unidirectional buses 705–708, also labeled as buses $AIn_0$—$AIn_3$, through output boundary latches 717–720 and transmitters 741–744. In this example, there is only a single cycle of delay at the output boundary latches 717–720, 727, and 728.

From the descriptions above for FIGS. 4–7, it may be understood that a transaction is issued by a master device via its bus and port to its node controller. The node controller will provide some type of immediate response to the master device via the bus and may queue the transaction for subsequent issuance to the rest of the system. Once the transaction is issued to the rest of the system, the address switch ensures that the transaction can be broadcast to the rest of the system with a known propagation delay so that the other devices may snoop the transaction.

According to the distributed system structure of the present invention, each of the devices within the system would be able to see the transaction in the same cycle and provide a coherence response within the same cycle. The address switch is able to broadcast a transaction to all node controllers, including the node controller of the node containing the device that issued the transaction. Appropriate logic is embedded within each node controller so that a node controller may determine whether the incoming transaction being snooped was originally issued by a device on one of its ports. If so, then the node controller ensures that the bus on the port that issued the transaction is not snooped with a transaction that was received from that port. Otherwise, the device may get "confused" by being snooped with its own transaction. If the device were to receive a snoop of its own transaction, then the device may issue a response indicating a collision with its original transaction. If that were the case, since the original transaction is actually the transaction that is being snooped, then the "collision" would never be resolved, and the transaction would never complete.

More details of the manner in which the transactions are issued and completed are provided below.

Memory Subsystem Internal Address Paths

Figure 8:
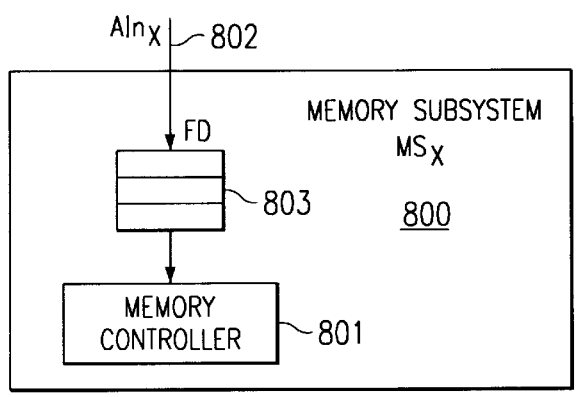
FIG. 8 is a diagram depicting a memory subsystem connected to the address switch of the distributed system of the present invention.

With reference now to FIG. 8, a diagram depicts a memory subsystem connected to the address switch of the distributed system of the present invention. FIG. 8 shows memory subsystem 800, also labeled memory subsystem $MS_X$. Memory controller 801 within memory subsystem 800 receives a command from the address switch via unidirectional bus 802, also labeled as bus $AIn_X$, through a number of latches FD 803, which is merely a fixed delay pipe. In this manner, a command sent by the address switch experiences a fixed number of cycles of delay before the command is made available to the memory controller.

As shown previously, a command arriving at a node controller via bus $AIn_X$ traverses a deterministic delay path from its capture in the FROM_ASX_BL latch to its presentation to a master device. In a similar manner, a command traverses a deterministic delay path from the control unit/multiplexer within the address switch to the fixed delay pipe within the memory subsystem. If the delay of the latches FD 803 within the memory subsystem is adjusted to the appropriate value, it can be ensured that the memory controller is presented with a command at the same time that the masters connected to the ports of the node controllers are presented with the same command. Hence, there is a deterministic number of cycles between the point at which the control unit/multiplexer within the address switch broadcasts a transaction and the point at which the masters and memory controllers receive the command.

Since only a small number of masters are connected to each port of a node controller, the speed at which each bus is connected to these ports may be operated is independent of the total number of ports in the system. For example, if a single master is connected to each port, its bus can be run in point-to-point mode at the best possible speed. Hence, the distributed structure of the present invention is able to scale well-understood and easier-to-verify bus-based cache-coherent protocols for multiprocessors to enhance the bandwidth of the system.

Node Controller Internal Data Paths

Figure 9A:
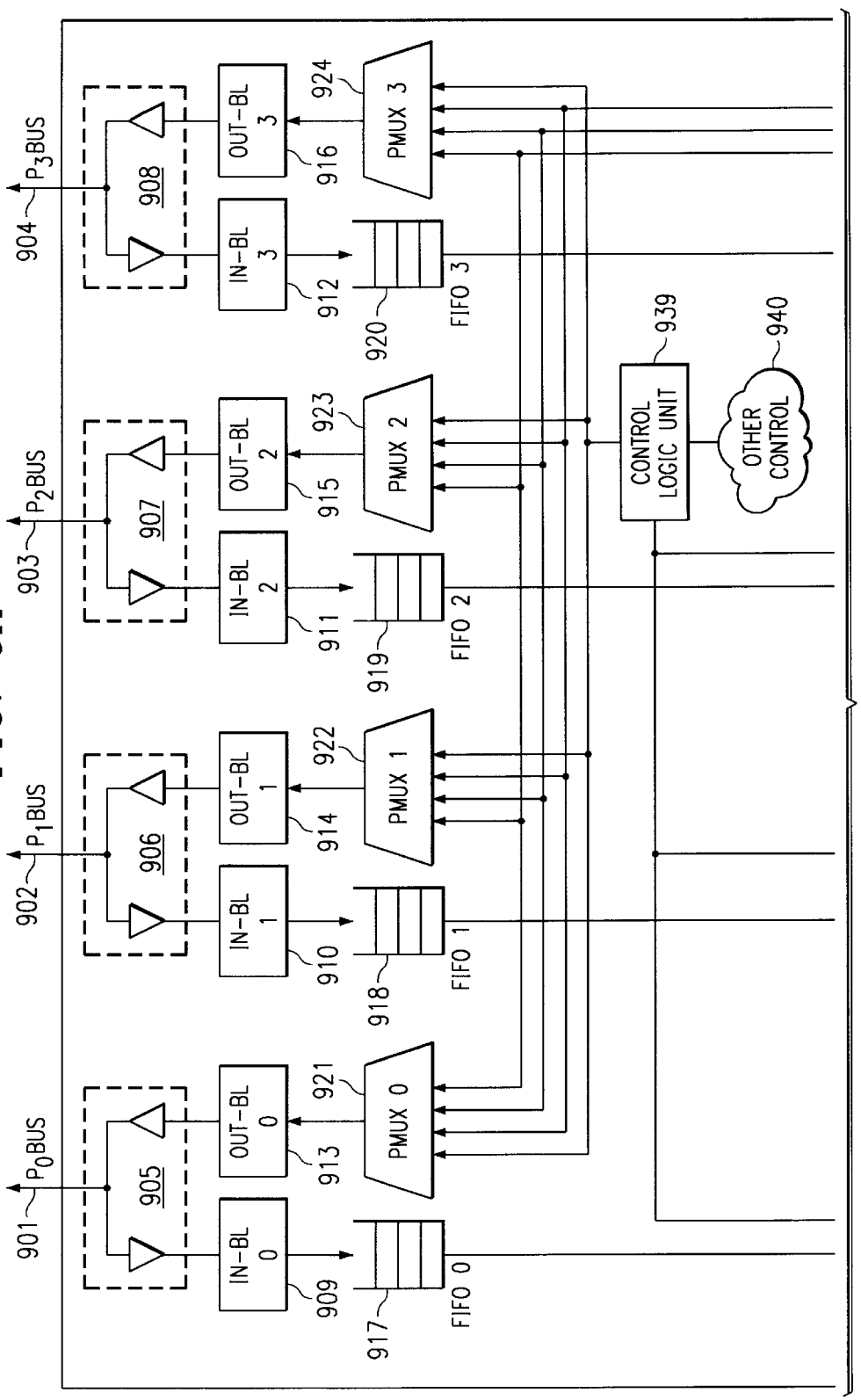
FIG. 9A–9B are block dragrams depicting the data paths internal to a node controller.
Figure 9B:
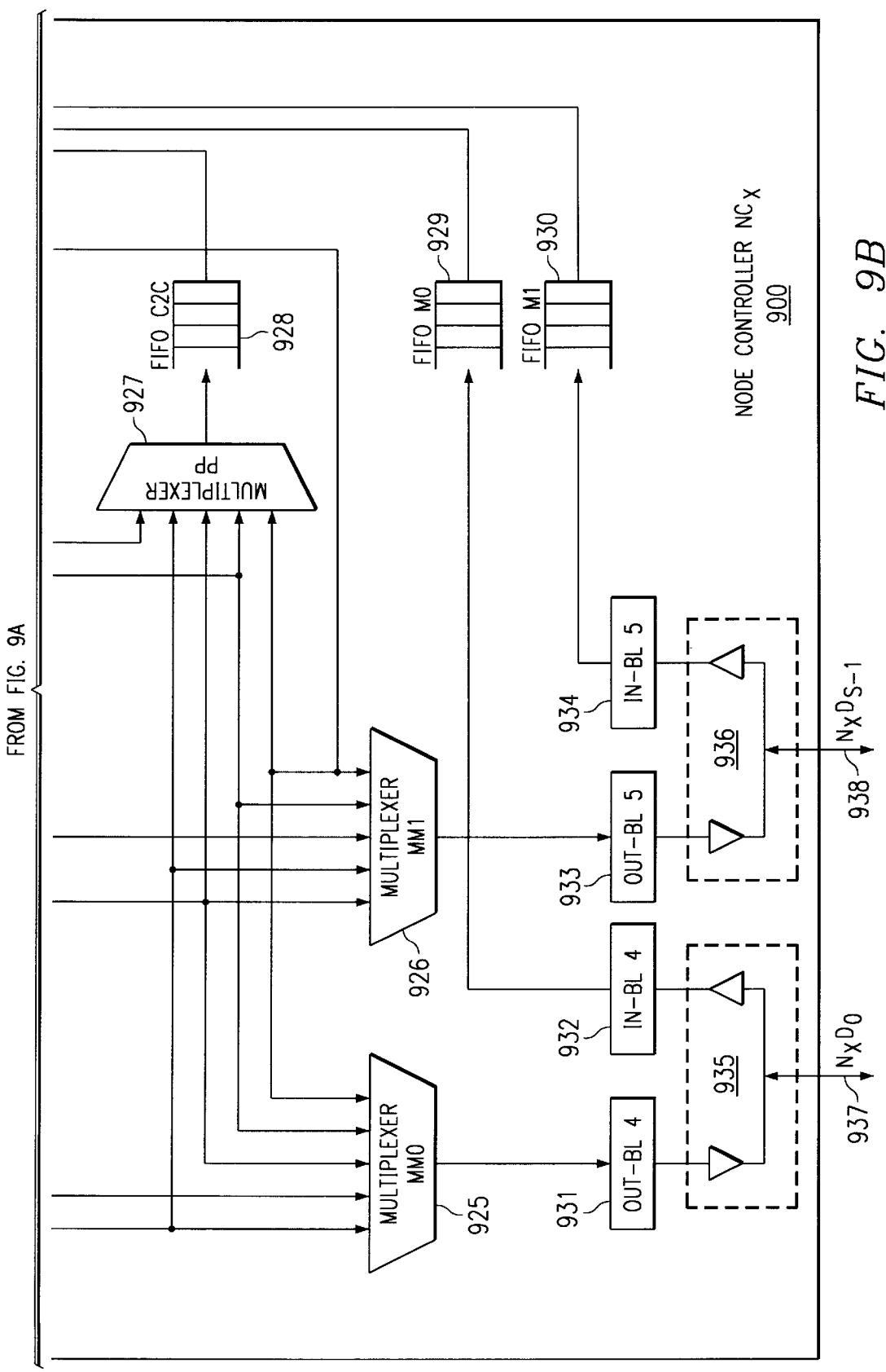

With reference now to FIG. 9A–9B, block diagrams depicts the data paths internal to a node controller. Node controller 900, also labeled $NC_X$, is similar to node controllers 415 and 425 in FIG. 4 or node controllers 515 and 525 in FIG. 5. Individual ports of node controller 900 have their own queues to buffer data from masters as data enters the node controller. Data may incur non-deterministic delay while waiting in these buffers for progressive movement toward destinations.

Node controller 900 has bidirectional buses 901–904, also labeled $P_X$Bus, that connect to master devices. Buses 901–904 connect to input boundary latches 909–912 and output boundary latches 913–916 via bus transceivers 905–908. Input boundary latches 909–912 feed data buffers 917–920 that hold the data from the master devices.

Incoming data from one of the node controller's ports may be directed to a memory subsystem or another cache. In the examples shown in FIGS. 9A–9B, which continues the example shown in FIG. 6, incoming data from one of the node controller's ports may be directed to one of three locations: memory subsystem $MS_0$, memory subsystem $MS_{S-1}$, or a cache-to-cache FIFO (FIFO C2C) for forwarding data within the node. With the FIFO C2C mechanism, each node is able to transfer data from one of its ports to another port, thereby allowing the transfer of data from one master to another. Buffers 917–920 feed multiplexers 925–927 that select a data source for forwarding data. Control logic unit 939 provides control signals for multiplexer 925 to select data to be sent to memory subsystem $MS_0$ and for multiplexer 926 to select data to be sent to memory subsystem $MS_{S-1}$. Node controller 900 sends data from multiplexers 925 and 926 through boundary latches 931 and 933 and transceivers 935 and 936 to memory subsystem $MS_0$ and memory subsystem $MS_{S-1}$ via bidirectional buses 937 and 938, also labeled $N_XD_0$ and $N_XD_{S-1}$. Control logic unit 939 provides control signals for multiplexer 927 to select data to be forwarded within the node. Data is then queued into FIFO 928.

In a corresponding manner, node controller 900 accepts data through transceivers 935 and 936 and boundary latches 932 and 934 from memory subsystem $MS_0$ and memory subsystem $MS_{S-1}$ via bidirectional buses 937 and 938. Data is then queued into appropriate FIFOs 929 and 930. Data from FIFOs 928–930 pass through a multiplexer per port, such as control units/multiplexers 921–924. Control logic unit 939 provides control signals for multiplexers 921–924 to select data to be sent to the master devices. Control logic unit 939 also receives other control signals 940, as appropriate. Hence, the node controller has arbitration logic for data buses and is self-sufficient in terms of controlling the data transfers with parallelism. In this manner, the distributed system structure of the present invention is able to improve system data throughput.

Response Combination Block (RCB)

Figure 10A:
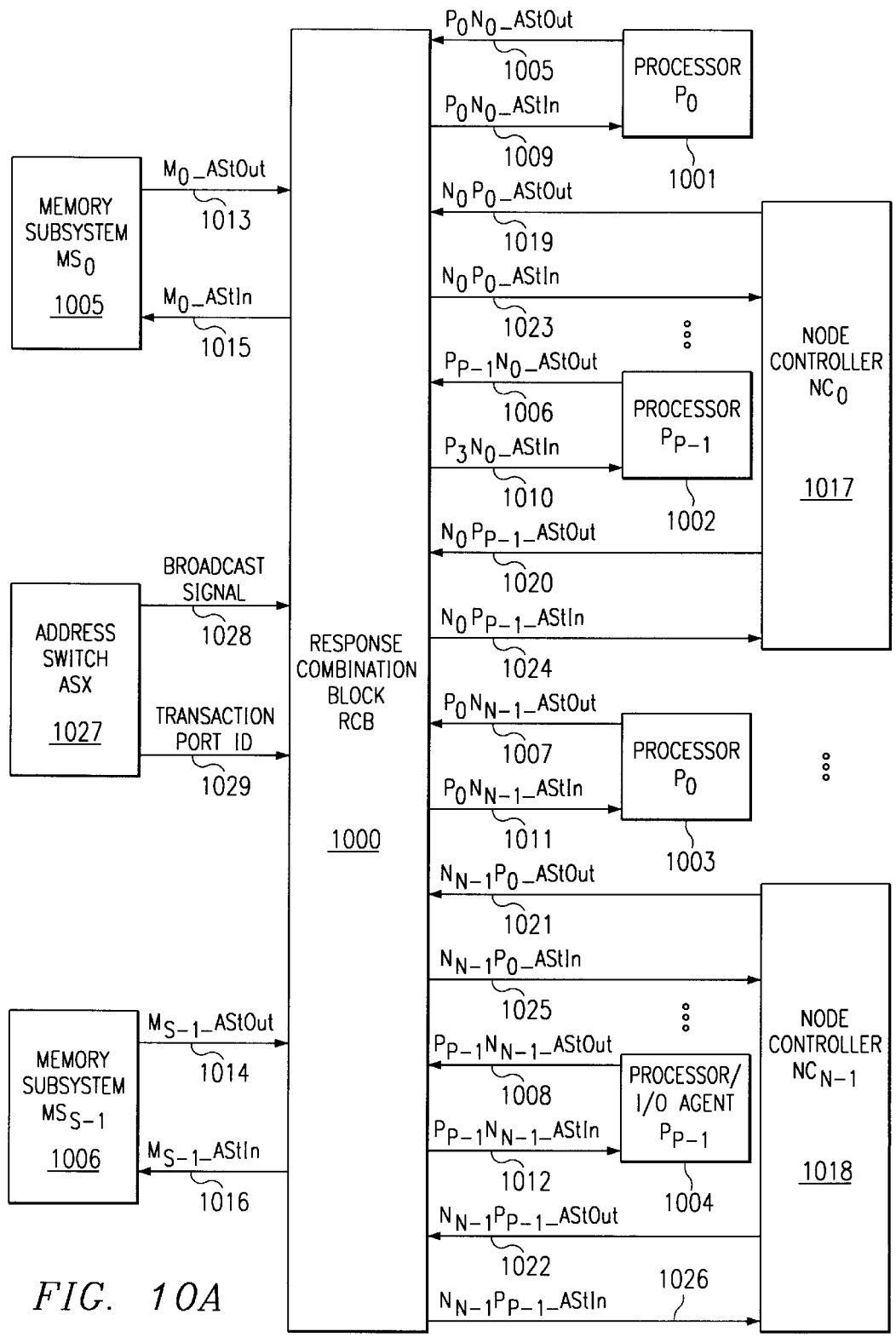
FIGS. 10A–10B are block diagrams depicting the system structure for determining bus response signals for a distributed system structure.
Figure 10B:
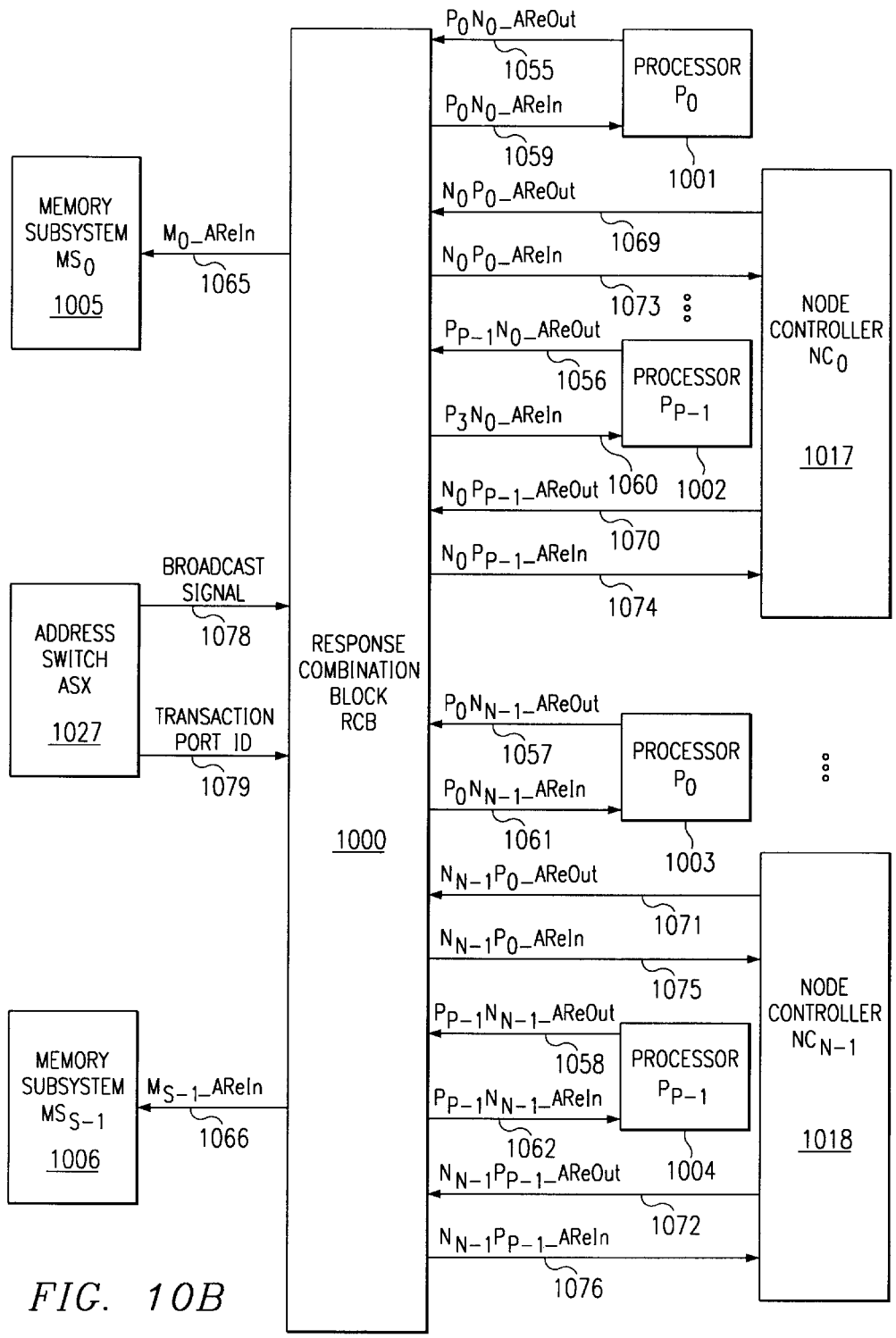

With reference now to FIGS. 10A–10B, block diagrams depict the system structure for determining bus response signals for a distributed system structure similar to that shown in FIG. 4 and FIG. 5. FIG. 10A and FIG. 10B show the connectivities of devices in the distributed system structure of the present invention with a control logic block for combining bus signals (responses) AStat and AResp, respectively. For the sake of clarity, the AStat signals and the AResp signals have been shown separately. It should again be noted that I/O agents may act as master devices connected to the ports of the node controllers shown in FIG. 10A and FIG. 10B.

As shown in FIG. 10A, processors 1001–1004, also labeled $P_X$, have unidirectional AStatOut signals 1005–1008, also labeled $P_XN_X$AStOut, and AStatIn signals 1009–1012, also labeled $P_XN_X$AStIn, connecting the processors to Response Combination Block (RCB) 1000. The slave devices, such as memory subsystems 1005 and 1006, also labeled $MS_X$, connect to the RCB with AStatOut signals 1013 and 1014, also labeled $M_X$_AStOut, and with AStatIn signals 1015 and 1016, also labeled $M_X$_AStIn.

Node controllers 1017 and 1018, also labeled $NC_X$, also connect to the RCB via a similar set of per port unidirectional AStatOut signals 1019–1022, also labeled $N_XP_X$AStOut, and AStatIn signals 1023–1026, also labeled $N_XP_X$AStIn. Address switch 1027, also labeled ASX, participates in determining the proper logic for system processing of a transaction by supplying broadcast signal 1028 and transaction source ID 1029, which is an encoding of a node identifier together with a port identifier within the node through which a master device issued a transaction to the system.

As shown in FIG. 10B, processors 1001–1004 have unidirectional ARespOut signals 1055–1058, also labeled $P_XN_X$AReOut, and ARespIn signals 1059–1062, also labeled $P_XN_X$AReIn, connecting the processors to RCB 1000. Memory subsystems 1005 and 1006 connect to the RCB with ARespIn signals 1065 and 1066, also labeled $M_X$_AReIn. Memory subsystems 1005 and 1006 do not connect with ARespOut lines, which are not driven by these slave devices. Node controllers 1017 and 1018 also connect to the RCB via a similar set of per port unidirectional ARespOut signals 1069–1072, also labeled $N_XP_X$AReOut, and ARespIn signals 1073–1076, also labeled $N_XP_X$AReIn. Again, address switch 1027 participates in determining the proper logic of a transaction by supplying broadcast signal 1078 and transaction port ID 1079. RCB 1000 supplies a HOLDTAG signal, such as signals 1091 and 1092, to each node controller in certain circumstances, as explained further below.

As is apparent from FIGS. 10A–10B, a set of AStatIn/AStatOut signals and ARespIn/ARespOut signals to/from a master device is paired with a similar set of AStatIn/AStatOut signals and ARespIn/ARespOut signals to/from its node controller. This pairing is done on a per port basis. As discussed above, each port in the example is shown with a single master device connected to each port. However, if more than one master device were connected per port, then the pairs of AStatIn/AStatOut signals and ARespIn/ARespOut signals are used by the set of master devices connected to the bus on that port as in a standard single bus configuration.

In the preferred embodiment, RCB combines the AStatOuts and ARespOuts from various source devices and produces AStatIn and ARespIn signals per the 6xx bus specification, as described in IBM Server Group Power PC MP System Bus Description, Version 5.3, herein incorporated by reference. The RCB receives the AStatOuts and ARespOuts signals and returns AStatIns and ARespIns, respectively. Not all of the devices receive the same responses for a particular transaction. The signals received by each device are determined on a per cycle basis as described in more detail further below.

Local/Global cycles

During any given system cycle, a master device at a port may be issuing a transaction over its port's bus for receipt by its node controller or the node controller may be presenting the master device with a transaction forwarded by the address switch in order to snoop the transaction. When the master device is issuing a transaction, the cycle is labeled "local," and when the node controller is presenting a transaction, the cycle is labeled "global."

As described above, the address switch broadcasts one transaction at a time to all of the node controllers, and there is a fixed delay between the time the address switch issues such a transaction and the time it appears at the ports of each node controller. Under this regime, after a node controller has received a broadcast transaction from the address switch and then, a predetermined number of cycles later, is presenting the transaction to the devices on the buses of the ports of the node controller during a cycle, all node controllers are performing the same action on all of their ports during the same cycle, except for one exception, as explained below. Thus, when there is a global cycle being executed on the bus of one of the ports, global cycles are being executed on all the ports in the system. All remaining cycles are local cycles.

During local cycles, activity at a port is not correlated with activity at other ports within the system. Depending on whether or not a device needed to issue a transaction, the local cycle would be occupied or would be idle. Hence, a global cycle occurs when a transaction is being snooped by all the devices in the system, and only a local cycle may be used by a device to issue a transaction.

Operation of RCB During Local Vs Global Cycles

Given that the entire system's cycles are "colored" as either local or global, the response generation, the response combination, and the response reception cycles, which occur after a fixed number of cycles subsequent to the issuance of a transaction, are similarly labeled local response windows or global response windows. For this reason, the RCB's response combination function is correspondingly considered to be in either local or global mode during a given cycle. During local cycles, the RCB combines responses on a per port basis. That is, the ROB combines the response of a port and the response that the node controller produces corresponding to that port. During global cycles, the RCB combines responses from all the ports and node controllers in the system (again, except for one port, as explained below).

To achieve proper switching between local and global combination modes, the RCB is provided with a signal indicating the broadcast of a transaction by the address switch to the node controllers, shown as broadcast signal 1028 in FIG. 10A, as well as the transaction source ID signal 1029. Configuration information stored in the RCB indicates the exact cycle in which the combination of responses is to be performed for the broadcast transaction after the arrival of the broadcast transaction signal. In this manner, for each global cycle, the RCB is orchestrated to combine responses from appropriate sources.

Primary Vs Secondary Local cycles

A processor may issue a transaction only during local cycles. For certain types of transactions, the processor issues the transaction only once. For certain other types of transactions, the processor might be required to issue the transaction multiple times. The processor is directed by its node controller, in conjunction with the RCB, through the use of the AStatIn/AStatOut signals and the ARespIn/ARespOut signals as to the actions that should be performed.

The local cycles in which a processor issues transactions for the first time are labeled "primary local cycles" whereas all other local cycles are labeled "secondary local cycles". In the 6xx bus architecture, a secondary transaction is marked by the "R" bit being set to "1". In other words, its response-related cycles get labeled primary or secondary in the proper manner corresponding to the transaction issuance.

Achievement of Coherence by Snooping in a Temporally and Spatially Distributed Manner From the foregoing description, it should be obvious that processors and devices see transactions from other processors and devices during cycles different than the cycle in which are issued to the system. This is unlike the situation with a snooping protocol in a single bus environment in which all the devices in the system observe a transaction at the same time that it is issued and simultaneously produce a coherence response for it and in which the originator of the transaction receives the response at that same time. Thus, in the current system, the achievement of coherence is both distributed in time and distributed in space, i.e. across multiple cycles and multiple buses connected to multiple node controllers.

In using the distributed system structure, it is important to achieve global coherence in an efficient manner. To do so, all transactions are sorted into two categories: (1) transactions for which it is possible to predict the global coherence response and deliver it in the primary response window; and (2) transactions for which it is necessary to snoop globally before the ultimate coherence response can be computed.

In the first case, the node controller accepts the transaction and issues a global coherence response to the issuing entity in the primary response window. The node controller then takes full responsibility of completing the transaction in the system at a later time and achieving the global response.

In the second case, the node controller takes three steps. First, the node controller accepts the transaction and delivers a primary response that indicates postponement of achievement and delivery of the global response. In the 6xx bus architecture, this response is the "Rerun" response. Second, at a subsequent time, the node controller achieves a global coherence response for that transaction. And third, the node controller requests that the processor issue a secondary transaction and delivers the global response in the secondary response window. In the 6xx bus architecture, the request to the processor to issue a secondary transaction is made by issuing it a Rerun command with a tag corresponding to the original transaction. The processor may then use the tag to identify which of its transactions should be rerun.

Rerun Commands and Secondary Responses

As noted above, a transaction accepted from a device is snooped to the rest of the system. During such a snoop, the device that issued the transaction is not snooped so that the device does not get confused by being snooped with its own transaction.

In fact, for transactions in the first case above, i.e. transactions in which the node controller accepts the transaction and issues a global coherence response to the issuing entity in the primary response window, the port corresponding to the device that issued the transaction is kept in the local mode in the transaction's snoop cycle so that the processor may issue another transaction. As stated above, during the response window corresponding to the transaction's snoop cycle, the RCB is configured to combine responses from all sources other than the port on the node controller that issued the transaction. The node controller is then able to supply a primary or secondary response over that port if the processor chooses to issue a transaction.

For transactions in the second case above, i.e. transactions for which it is necessary to snoop globally before the ultimate coherence response can be computed, the node controller keeps the particular port in local mode but issues it a Rerun transaction. The control unit/multiplexer feeding the outgoing boundary latch at the port allows the node controller to achieve this functionality.

Alternatively, the node controller may choose to not be as aggressive, and instead of letting the device issue a transaction, the node controller might itself issue a null or rerun transaction, as required, to the device in the cycle during which the device's transaction is being snooped in the rest of the system.

Figure 10C:
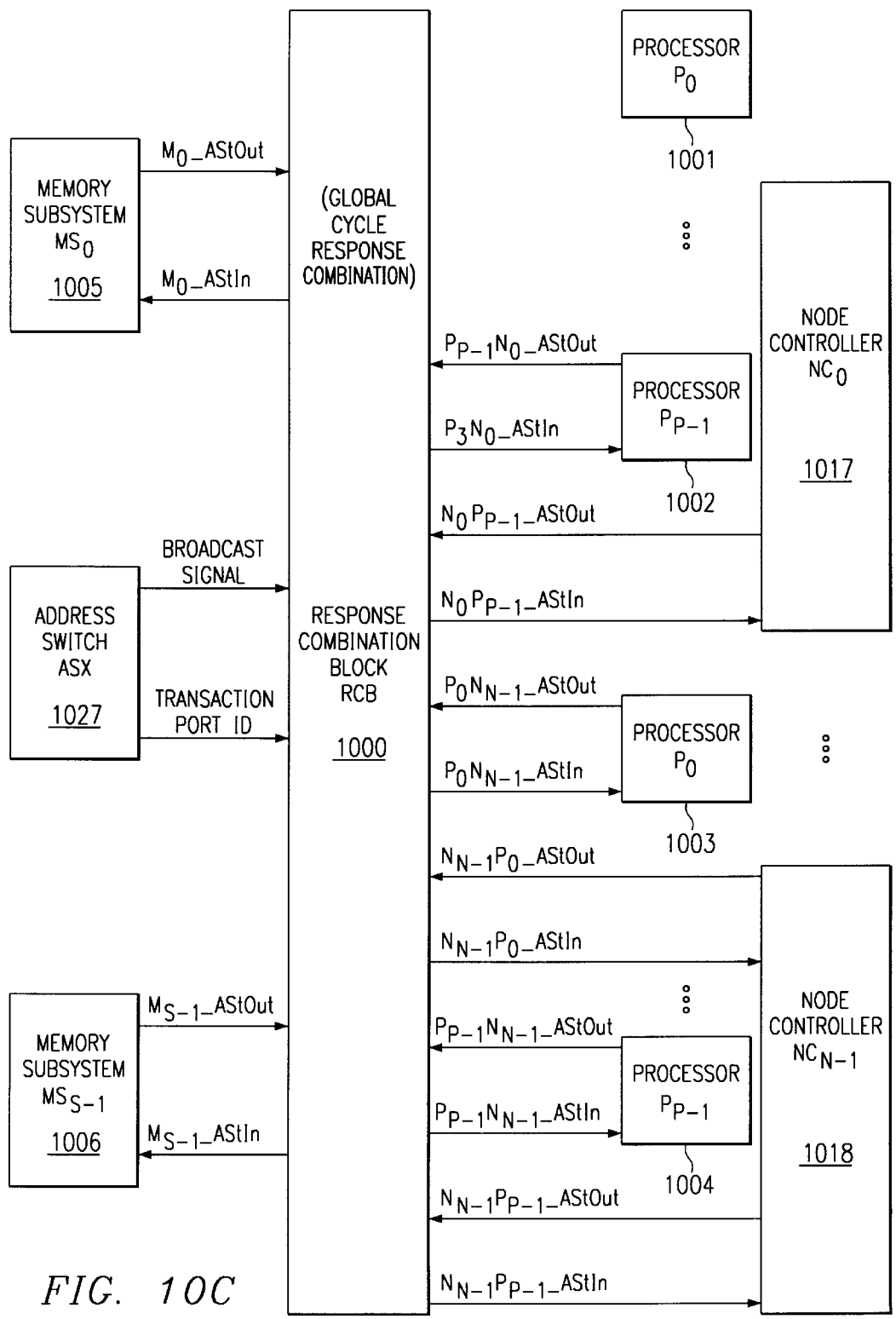
FIGS. 10C–10D are block diagrams depicting the components whose signals participate in the local and global cycles.
Figure 10D:
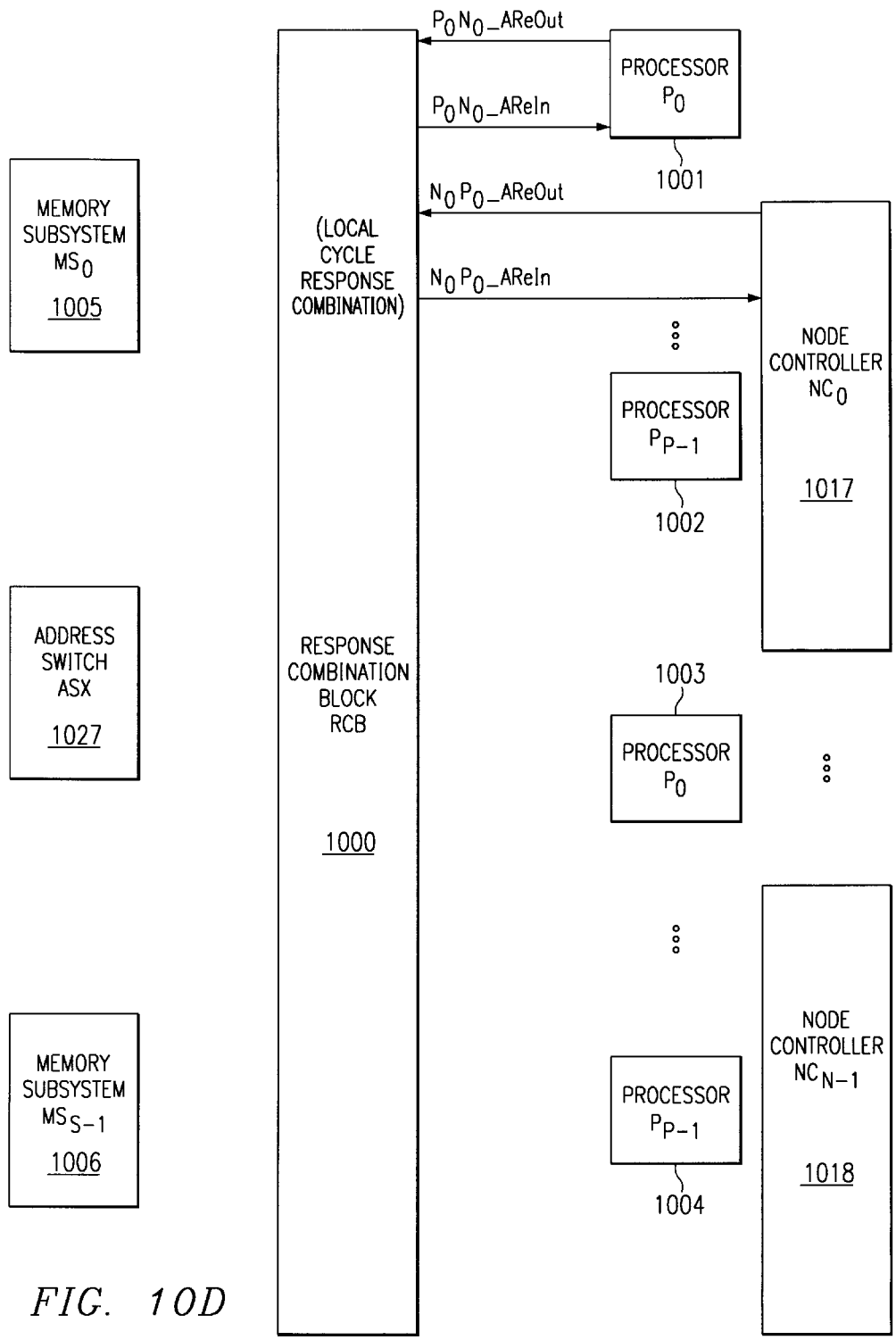

With reference now to FIGS. 10C–10D, block diagrams depict the components whose signals participate in the local and global cycles. FIG. 10C shows the signals which are considered by the RCB during a global cycle. In the example shown, the signals for a single master device, processor 1001, do not participate in the determination by the RCB of the appropriate signals to the other devices, node controllers, and memory subsystems for the global response. The signals for processor 1001 are paired with the corresponding signals from its node controller, which are also not considered for the global response. From the perspective of processor 1001, it is kept in a local cycle while a transaction issued by processor 1001 is snooped by the rest of the system. As noted earlier, although a processor is depicted, the signals are considered on a per port basis, and the bus of a particular port is kept in a local cycle while the rest of the system is in a global cycle.

FIG. 10D shows the signals which are considered by the RCB during a local cycle. In the example shown, the signals from a single master device, processor 1001, participate in the determination by the RCB of the appropriate signals to be returned to processor 1001 and its node controller. Signals from the other devices, node controllers, and memory subsystems may be simultaneously participating in the response for the global response. The signals for processor 1001 are paired with the corresponding signals from its node controller, which also do not affect the global response. From the perspective of processor 1001, it may issue another transaction while its other transaction is snooped by the rest of the system. For the sake of clarity, signals from the address switch are not shown for the local cycle, although the RCB uses these signals to determine which port to place into the local cycle.

Achieving Correct Order Among Bus Memory Transactions

For a computer system to work correctly, certain memory access transactions and other types of transactions issued by master devices have to be ordered correctly and unambiguously. In a system with a single system bus, this task is trivially achieved since the order in which the transactions are presented on the bus is the order imposed on those transactions. However, in a distributed system with multiple buses, the task demands that an order be imposed on the transactions queued throughout the system. The distributed architecture of the present invention allows a correct and unambiguous order to be imposed on a set of transactions. The invention also offers an efficient means of achieving the order so that a snooping, hardware cache-coherence protocol can be supported.

When devices in an SMP system access memory, either under the influence of programs or control sequences, they issue memory transactions. The devices may also issue other bus transactions to achieve coherence, ordering, interrupts, etc., in the system. These transactions can usually complete in parallel without interference from other transactions. However, when two transactions refer to addresses within the same double word, for example, they are said to have "collided," according to the 6xx bus terminology, and the two transactions must be completed in some specific order. In some cases, either completion order is acceptable, and at other times, the order is fixed and is implied by the types of transactions. For instance, if a read transaction and a Write transaction attempt to access an address declared as Memory Coherence Not Required, any order of completion for the two transactions is acceptable. However, if they refer to a cachable address to be maintained coherent, the order of completion must appear to be the write followed by the read.

Means of Imposing a Default Order on Transactions

In the distributed SMP system described in FIGS. 4–10D, multiple processors and other devices can issue transactions simultaneously over the multiple buses in the system. Thus, at the outset, there is ambiguity regarding the order of the transactions as they are issued. As they flow through the system, as a first step, the system imposes a "heuristic order of arrival" over them that is reasonable and fair. This preliminary order is not necessarily the order in which the transactions eventually complete in the system. If two colliding transactions are simultaneously active in the system, the one that ranked "earlier of the two" by the heuristic order of arrival will be slated to be completed first if coherence does not require otherwise.

As soon as commands enter the system, they are "registered" by the node controllers, i.e. they are stored by the node controllers and are available for analysis and collision checks. Node controllers send one of the registered transactions at a time to the address switch. The address switch chooses one transaction at a time with a fair arbitration among the transactions sent to it and then broadcasts the chosen transaction back to the node controllers and to the memory subsystems. The address portion of the transaction broadcast by the address switch is first latched inside the node controller in the boundary latch FROM_ASX_BL. As described above, in any cycle, a unique transaction is latched in FROM_ASX_BL at all node controllers and memory subsystems, and all other registered transactions that have entered until that cycle and are still active, including the transaction currently in FROM_ASX_BL, can "see" this transaction. These two properties are used to define the order of arrival of transactions using the following reasonable and fair heuristic: the order of arrival of a transaction into the system is the same as the order of its arrival at FROM_ASX_BL.

When a transaction arrives in FROM_ASX_BL for the first time, it is marked as being "snooped," to indicate the fact that in a fixed number of cycles following the current cycle, the transaction will be presented for snooping, for the first time, to all the devices in the system. The following rule is used to assign a transaction its relative position in the order of transactions to be completed, irrespective of the actual time it entered the system: a registered transaction that already is marked as snooped is nominally defined to have entered the system earlier than the current transaction in FROM_ASX_BL. The ones that have not been marked as snooped are nominally defined to have entered the system later than the current transaction in FROM_ASX_BL.

Method for Achieving the Correct Completion Sequence for Transactions

The transaction in FROM_ASX_BL stays there for one cycle. During that cycle, the transaction is compared with every transaction currently registered in the entire system for detection of collision and ordering decision. There could be two sets of results of each of these pairwise comparisons: one that affects the completion of the transaction currently in FROM_ASX_BL and the second that affects the completion of some other transaction.

Each comparison results in a decision to either allow the current presentation of the transaction in FROM_ASX_BL for snooping to complete, or to postpone its completion to a later time. The postponement is effected via the computation of an AStat Retry signal or an AResp Retry signal, as is appropriate. These signals from individual comparisons are combined on a per node basis inside the node controller. A decision to postpone gets the highest priority, so even a single comparison calling for postponement wins and results in the node voting to postpone the transaction. Only if all comparisons within a node vote to allow the current snoop to complete does the node decide to let the transaction complete.

The combined AStat Retry and AResp Retry signals are encoded by the node controller into the AStat Retry and ARespRetry codes and are submitted to the RCB for participation in the global AStat and AResp windows of the transaction being snooped. During these windows, responses from all the devices, other than the device that issued the transaction, and node controllers are combined by the RCB to produce a global response which is returned to all the participants, as explained with respect to FIGS. 10A–10D above. Again, at this global level, a retry response has the highest priority (barring an error code) and will be the final response if any of the input responses was a retry. The effect of a global retry response is cancellation of the current snoop of the transaction. Upon sensing a global retry response for the transaction, the node controller in which the transaction is registered either reissues the transaction for global snoop or retires the original transaction from which the said transaction was derived.

These global retries can be repeated until the correct order is achieved.

If, for any reason, a transaction receives a retry response, its snooped marking is reset, and it thus loses its present nominal position in the transaction order in the system. When it returns for snoop, the transaction gets a new position, according to the rule above. The mechanism does not necessarily prohibit the possibility of the reissued transaction being ordered behind another transaction that entered the system after it. If, on the other hand, the current transaction completes, it may cause other transactions to get retried.

Generalizing Bus Arbitration and Protocols

As described above, the node controller constitutes the physical interface between a master and the rest of the system, and each node controller in the system contains all of the necessary logic to arbitrate for individual processor buses and to communicate with its local masters as another master or as a slave, i.e. a device that accepts master commands and executes them but does not generate master commands. A processor sends a command into the system via its local node controller, which then queues the commands and assumes responsibility for completing the commands in some form.

The following sections describe operational modes of a bus between a processor and a node controller or between a node controller and the memory subsystem. However, the discussion of the bus protocols can be generalized by noting that the operations of a node controller, at least from the perspective of arbitrating for the bus, may be replaced by a processor with a similar arbiter. This observation both simplifies the following discussions and generalizes the present invention as operational modes between two processors or between a processor and a memory subsystem.

It should be noted that one of ordinary skill in the art would understand that a bus arbiter may be included within the processor or, alternatively, may be a physically separate component with connections to the processor.

Method and Apparatus for Avoiding Data Bus Grant Starvation in a Non-fair, Prioritized Arbiter for a Split Bus System with Independent Address and Data Bus Grants The distributed SMP system described in FIGS. 4–10D has a split-bus system where address and data bus grants are given independently and the bus arbitration is performed by a non-fair, prioritized arbiter. The address bus is "parked", meaning grants are given for it even when not requested, but the data bus is not parked. When a request is made for both buses simultaneously, such as for a write to memory, the data bus grant must not be given before the address bus grant to avoid confusion in the requester. This is simple to do when the address bus is not parked. However, when the address bus is parked, significant cycle savings can be realized if a history of address bus grants is kept along with a notation about whether or not they were granted in response to a request or not.

An algorithm for avoiding starvation of data bus grants was devised for arbitration of a split bus system where address and data bus grants are given independently and the address bus is prioritized opposite the requester. Due to the latched nature of many high speed buses, it is entirely possible for a bus request to pass a parked, non-requested grant on the bus. If the address request is associated with a data request, it is possible to give the data bus grant immediately without having to wait to give an address bus grant if it can be determined that there has already been an address bus grant given which satisfies the address request.

The present invention provides an algorithm for looking up the last few address grants given to see if any of them could be used to satisfy the address request. If one of them qualifies, the data bus grant is given immediately, speeding up the data bus grant process by anywhere from one to many cycles depending on the requests for the address bus from another, higher priority requestor. This other higher priority requestor can keep getting the address bus for a considerable period of time at the expense of the lower priority requestor because of its higher priority. Thus, the lower priority requestor would have to wait awhile to receive an address bus grant and then a data bus without the use of this invention.

A second part of the invention also helps to alleviate data bus grant starvation when the data bus is also prioritized opposite the requester. Information is kept about the status of paired address/data bus requests as they are first requested, and then the address bus grant is given, and finally the data bus grant is given. When in the middle state of having given the address bus grant but not the data bus grant, the requester with higher priority may continue to receive data bus grants at the expense of the lower priority requestor trying to finish an address/data bus request sequence without some intervention using a preferred embodiment of the present invention.

Figure 11A:
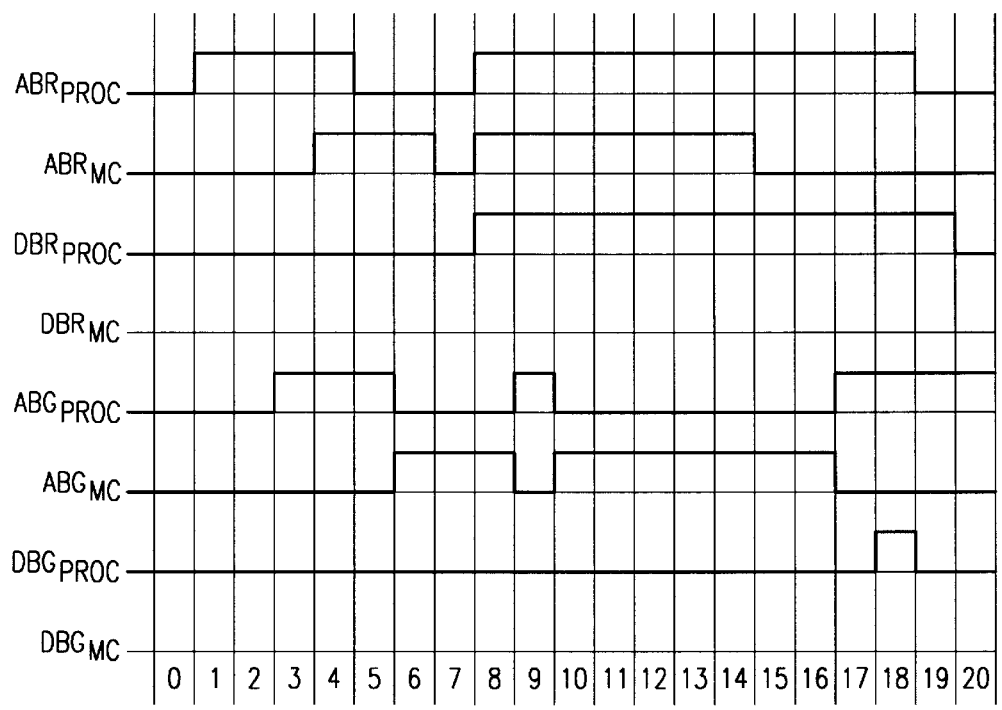
FIG. 11A is a timing diagram showing the manner in which a lower priority requester may get starved in a state in which it has received an address bus grant but not the data bus grant.

With reference now to FIG. 11A, a timing diagram shows the manner in which a lower priority requestor may get starved in a state in which it has received an address bus grant but not the data bus grant. In cycle 1, the processor makes an address bus request. In cycle 2, the arbiter sees the address request from the processor, and in cycle 3, the arbiter gives an address bus grant to the processor. In cycle 4, the memory controller makes an address bus request. In cycle 5, the arbiter sees the address bus request from the memory controller, and the processor deasserts its address bus request. In cycle 6, the processor loses its address bus grant, and the arbiter gives an address bus grant to the memory controller. In cycle 7, the memory controller deasserts its address bus request. In cycle 8, the processor and the memory controller both make an address bus request, and the processor also makes a data bus request. In cycle 9, the processor receives an address bus grant, and the memory controller loses its address bus grant.

In cycle 10, the processor loses its address bus grant, and the arbiter gives an address bus grant to the memory controller. In effect, any grant before cycle 10 is not expected or is too quick to be useful. Thus, the processor does not receive a paired address/data bus grant.

In cycles 11–14, the memory controller maintains its address bus request and does not relinquish it until cycle 15. Meanwhile, the processor maintains its address bus request and its data bus request. Finally, in cycle 17, the processor receives its address bus grant for the address bus request which was first asserted in cycle 8, and in cycle 18, the processor receives its data bus grant.

The present invention provides a temporary reversal of priorities only when the address bus grant has been given and the data bus grant has not been given. This avoids prolonged starvation of the low priority requestor during a particularly critical period for the requester. This reversal is postponed for one data bus grant to the higher priority requester if the higher priority requestor's request was active at the time the lower priority requestor's request was first seen. This maintains fairness to the older requestor even in this situation.

The specific invention consists of a coupled address/data bus arbiter between two entities, one being a processor, the other a node controller or memory controller. The memory controller has higher priority for both the address bus and the data bus, which could lead to serious starvation problems if not addressed in the arbiter's algorithms. Because the address bus is parked toward the processor, there are quite often times when grants are given without having been first requested. Also, the requests and grants are latched on both ends, leading to a four cycle delay between request and grant from the requestor's perspective.

The length of the delay depends upon the number of latches or stages through which requests/grants must pass. Where parked, i.e. unrequested, grants are given within a preconfigured or predetermined number of cycles prior to a coupled address/data bus request, a grant table/history table/toteboard is used to remember the parked grants which can be used to satisfy the address portion of the coupled address/data request.

For example, parked grants are kept track of with special toteboard logic that logs the status of the last three address grants given and whether or not they were requested. The size of the toteboard should match the number of latches through which requests/grants must pass. The intention is that a grant given without a request could be used to satisfy a request received in the arbiter after the grant was given. Effectively, the request and grant have passed each other on the latched bus. For address only requests, this is not particularly important to know. However, for address/data requests for writes, it is extremely important to know.

When an address/data request is received, the toteboard is evaluated to determine if any grants have been given that will be used by the requestor to satisfy the address request portion. If so, the data bus grant portion can be given immediately without worry that the requestor will see the data bus grant prior to the address bus grant. Of course, this presumes that the requestor cannot handle a data bus grant prior to an address bus grant. If it can, this invention is not needed.

The advantage is that the memory controller can keep getting address bus grants for a long time, temporarily starving out the processor from getting an address bus grant. If no address grant can be given, the data bus grant cannot be given either. Thus, this invention can save many cycles if unrequested parked address bus grants have just been given to the processor and then the processor makes an address/data request just as the memory controller enters a period of many address bus requests. Due to the nature of the memory controller, the priority of address bus requests cannot be temporarily reversed to solve this problem. Thus, this invention helps to alleviate one form of starvation under specific conditions that actually occur quite frequently.

Figure 11B:
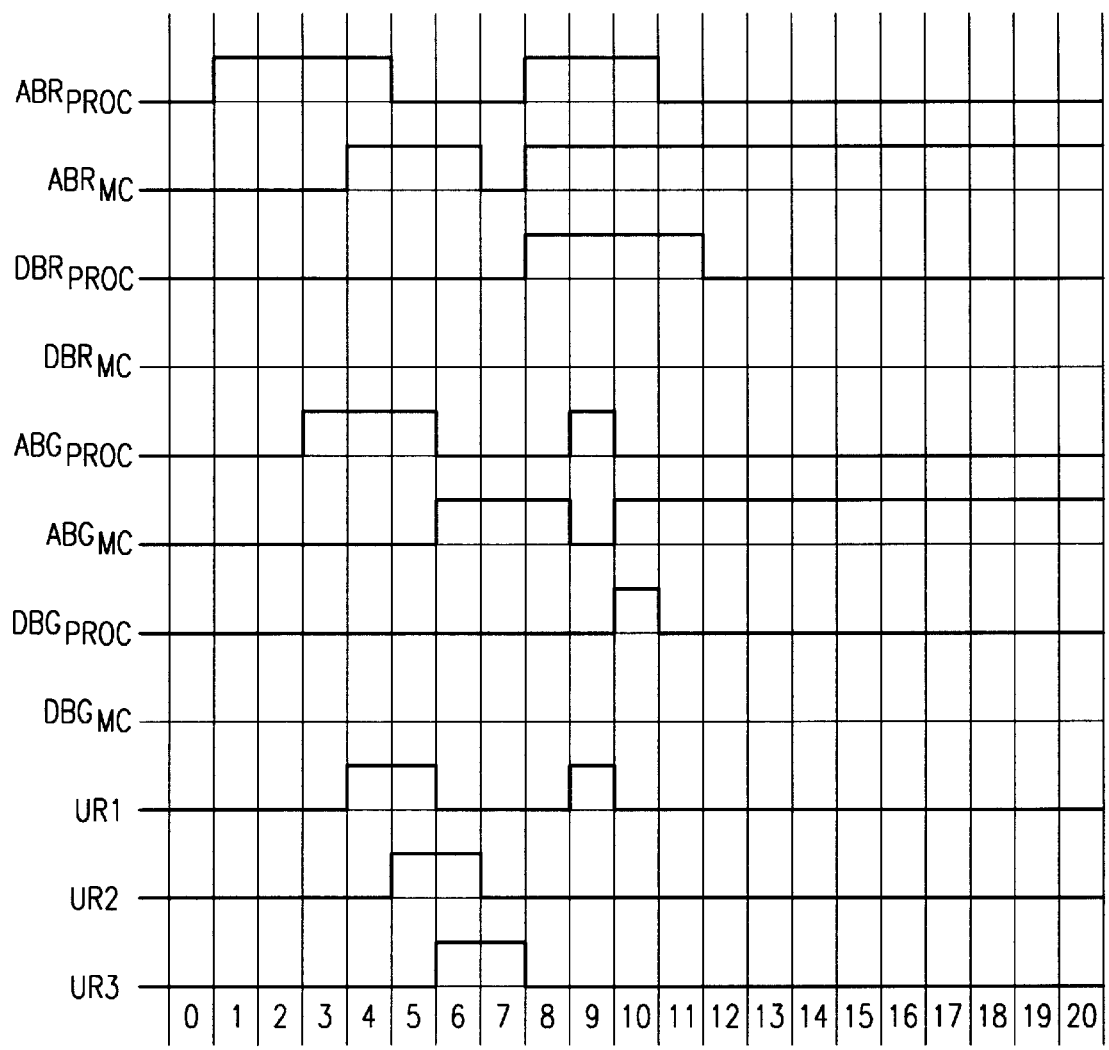
FIGS. 11B–11D are timing diagrams showing the manner in which a lower priority requestor receives a data bus grant after an address bus grant in accordance with a preferred embodiment of the present invention with less delay than the delay shown in FIG. 11A.
Figure 11C:
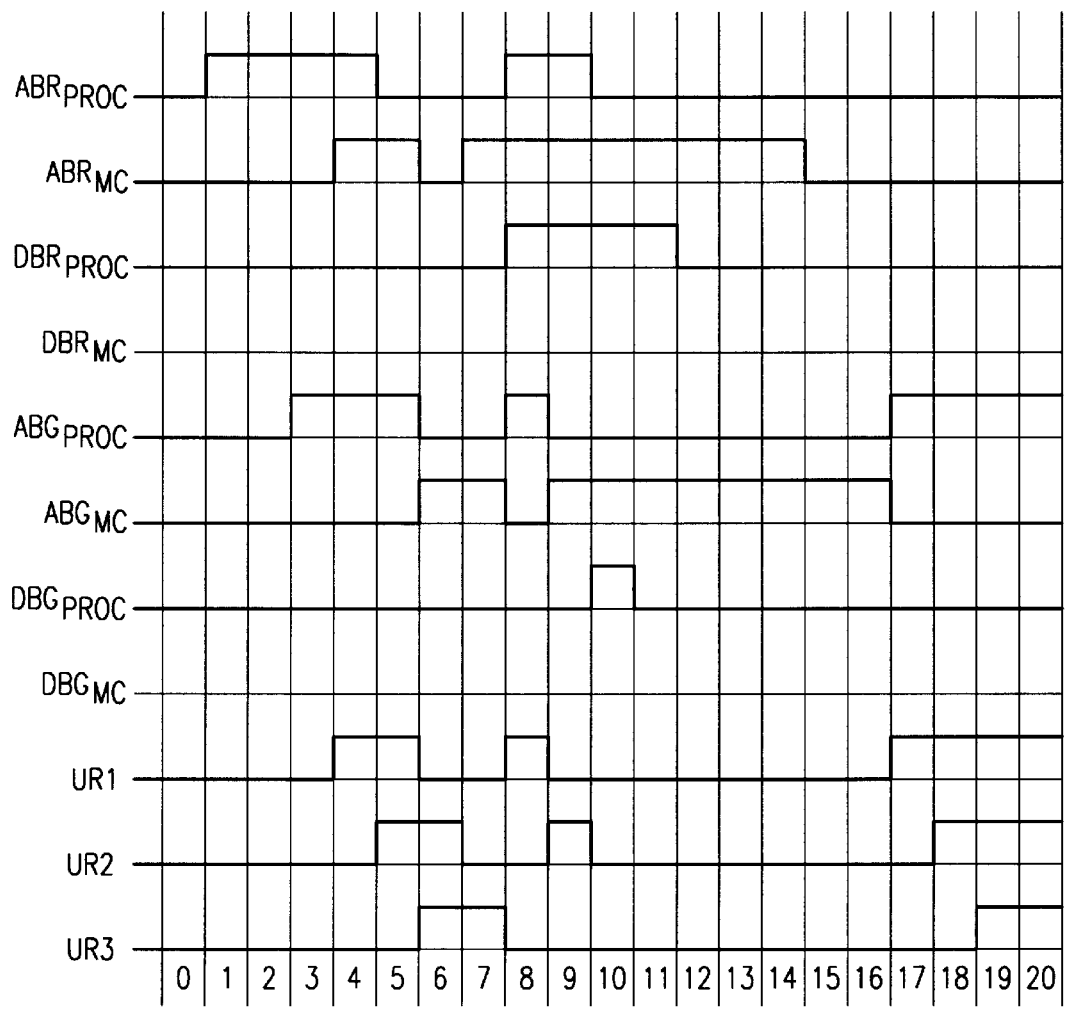
Figure 11D:
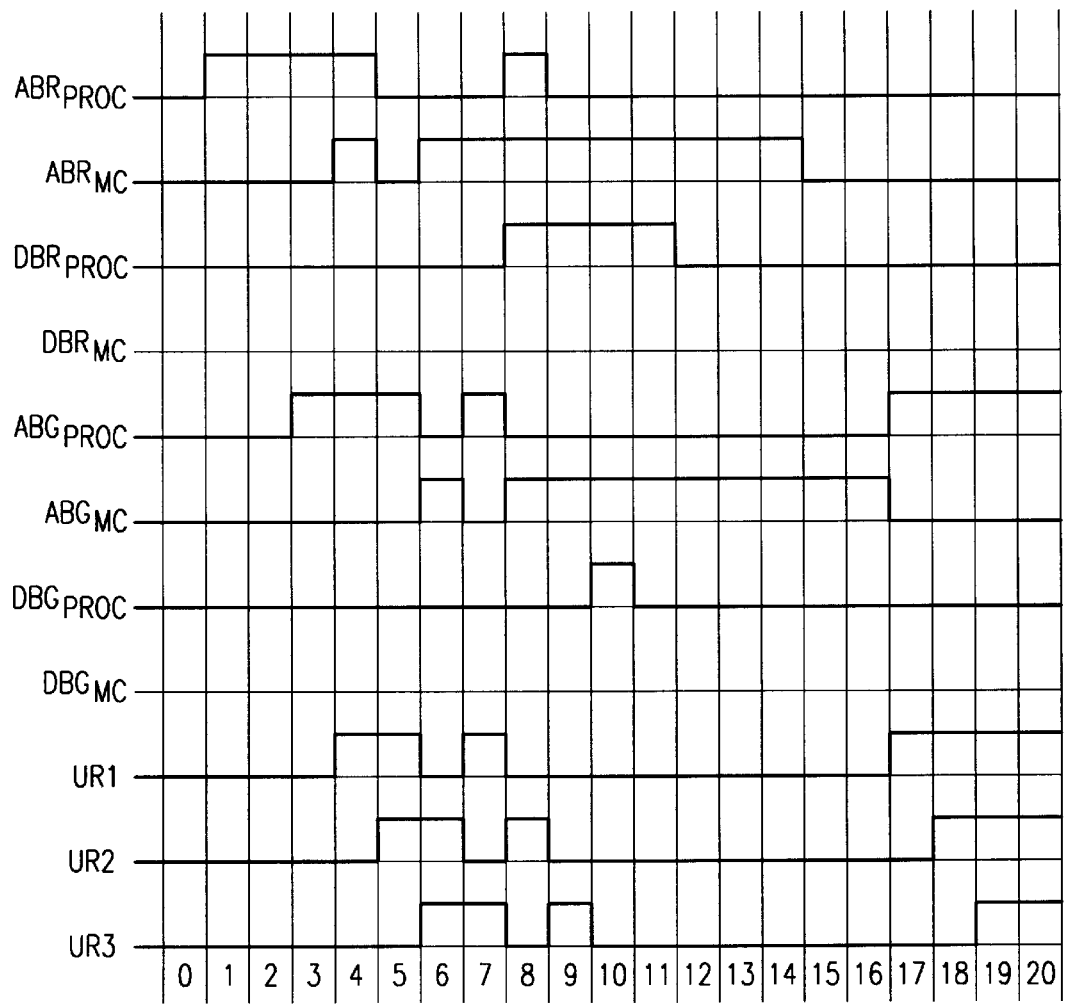

With reference now to FIGS. 11B–11D, timing diagrams show the manner in which a lower priority requester receives a data bus grant after an address bus grant using a toteboard in accordance with a preferred embodiment of the present invention with less delay than the delay shown in FIG. 11A.

In FIGS. 11B–11D, the unrequested address bus grants are logged in the toteboard with flags UR1, UR2, and UR3. When an unrequested grant is given by the arbiter, the UR1 flag is set on the same cycle to record cycle that an unrequested grant was given. Assuming that no address bus request is received in the next two cycles, on the next cycle, the UR2 flag maintains the value of UR1 from the previous cycle. On the next cycle, the UR3 flag maintains the value of UR2 from the previous cycle.

The unrequested grant propagates through the flags on the toteboard. In this manner, the state of an unrequested address bus grant is stored for three cycles using three flags, i.e. the minimum number of flags necessary to maintain a three cycle history in order to implement starvation avoidance in a system with four latches through which requests/grants must pass.

However, if an data bus request is observed while the toteboard is maintaining a record of a previous unrequested address bus grant such that the previous unrequested address bus grant fulfills a paired address/data bus request, then the unrequested grant is "converted" into a requested grant, and the record of the unrequested grant on the toteboard is cleared.

In FIGS. 11B–11D, the data bus request from the memory controller and the data bus grant to the memory controller are not used in the example data transfers.

Referring now to FIG. 11B, in cycle 1, the processor makes an address bus request. In cycle 2, the arbiter sees the address request from the processor, and in cycle 3, the arbiter gives a requested address bus grant to the processor.

In cycle 4: the arbiter maintains the address bus grant to the processor, i.e. the address bus is parked towards the processor or the processor receives an unrequested address bus grant; the memory controller makes an address bus request; and UR1 is set to record the unrequested address bus grant in cycle 4.

In cycle 5: the arbiter sees the address bus request from the memory controller; the processor deasserts its address bus request; UR1 is set to record the outstanding unrequested address bus grant; UR2 is set to reflect the value of UR1 from the previous cycle.

In cycle 6: the processor loses its address bus grant; the arbiter gives a requested address bus grant to the memory controller; UR1 is not set because of the requested address bus grant in cycle 6; UR2 is set to reflect the value of UR1 from the previous cycle; and UR3 is set to reflect the value of UR2 from the previous cycle, i.e. the fact that an unrequested address bus grant was given three cycles earlier.

In cycle 7: the memory controller deasserts its address bus request; and the UR1, UR2, and UR3 flags propagate.

In cycle 8: the processor and the memory controller both make an address bus request; the processor also makes a data bus request; the arbiter sees the deassertion of the address bus request by the memory controller; and the UR1, UR2, and UR3 flags propagate.

In cycle 9: the memory controller loses its address bus grant as the address bus is parked towards the processor based on the memory controller's deassertion of the address bus request in cycle 8; the processor receives the unrequested address bus grant, even though the processor has made an address bus request in cycle 9, i.e., the request and the grant pass each other on the bus; the arbiter sees the address bus request by the memory controller in cycle 8; the arbiter sees the data bus request first requested by the processor in cycle 8 and determines that the data bus grant cannot be given immediately to the processor as it is just receiving an address bus grant in cycle 9 but can be given on the next cycle based on the new value of UR1; and UR1 is set to record the unrequested address bus grant in cycle 9.

In cycle 10: the arbiter gives a requested address bus grant to the memory controller based on its address bus request that was first requested in cycle 8; the processor loses its parked address bus grant; the arbiter sees the data bus request by the processor and determines that the data bus grant can be given to the processor as it previously received an address bus grant in cycle 9 as recorded by UR1, so the arbiter gives a data bus grant to the processor, thereby "converting" the unrequested address bus grant in cycle 9 to a requested address bus grant in cycle 10; UR2 is not set as the unrequested data bus grant has been converted; and UR1 is not set because of the requested address bus grant in cycle 10.

In cycle 11: the arbiter deasserts the data bus grant as the data bus is not parked; the processor deasserts its address bus request; the processor sees the data bus grant from cycle 10; and the UR1, UR2, and UR3 flags propagate.

In cycle 12: the processor deasserts its data bus request; and the UR1, UR2, and UR3 flags propagate.

By comparing FIG. 11A and FIG. 11B, it can be seen that the processor receives its data bus grant as many as nine cycles earlier in FIG. 11B to complete a paired address/data bus request than in FIG. 11A.

Referring now to FIG. 11C, in cycle 1, the processor makes an address bus request. In cycle 2, the arbiter sees the address request from the processor, and in cycle 3, the arbiter gives a requested address bus grant to the processor.

In cycle 4: the arbiter maintains the address bus grant to the processor, i.e. the address bus is parked towards the processor or the processor receives an unrequested address bus grant; the memory controller makes an address bus request; and UR1 is set to record the unrequested address bus grant in cycle 4.

In cycle 5: the arbiter sees the address bus request from the memory controller; the processor deasserts its address bus request; UR1 is set to record the outstanding unrequested address bus grant; UR2 is set to reflect the value of UR1 from the previous cycle.

In cycle 6: the processor loses its address bus grant; the arbiter gives a requested address bus grant to the memory controller based on its address bus request in cycle 4; the memory controller deasserts the address bus request; UR1 is not set because of the requested address bus grant in cycle 6; UR2 is set to reflect the value of UR1 from the previous cycle; and UR3 is set to reflect the value of UR2 from the previous cycle, i.e. the fact that an unrequested address bus grant was given three cycles earlier.

In cycle 7: the arbiter sees that the memory controller deasserted its address bus request in cycle 6; and the UR1, UR2, and UR3 flags propagate.

In cycle 8: the arbiter parks the address bus towards the processor; the memory controller loses its address bus grant; and UR1 is set to show that the address bus grant was unrequested.

In cycle 9: the arbiter gives a requested address bus grant to the memory controller based on its address bus request in cycle 7; the processor loses its address bus grant; UR1 is not set because the address bus grant was requested; and UR2 is set because UR1 was set in the previous cycle.

In cycle 10: the processor deasserts its address bus request; the arbiter sees the data bus request by the processor and determines that the data bus grant can be given to the processor as it previously received an address bus grant in cycle 8 as recorded by UR2, so the arbiter gives a data bus grant to the processor, thereby "converting" the unrequested address bus grant in cycle 8 to a requested address bus grant in cycle 10; UR3 is not set as the unrequested data bus grant has been converted; and UR1 is not set because of the requested address bus grant in cycle 10.

In cycle 11: the arbiter deasserts the data bus grant as the data bus is not parked; the processor sees the data bus grant from cycle 10; and the UR1, UR2, and UR3 flags propagate.

In cycle 12: the processor deasserts its data bus request; and the UR1, UR2, and UR3 flags propagate.

In cycle 16: the arbiter decides to repark the address bus towards the processor, and in cycle 17, the address bus is reparked.

By comparing FIG. 11A and FIG. 11C, it can be seen that the processor receives its data bus grant as many as nine cycles earlier in FIG. 11C to complete a paired address/data bus request than in FIG. 11A.

Referring now to FIG. 11D, one can see that FIG. 11D is similar to FIG. 11C except that some of the signals are shifted left by one cycle in FIG. 11D as the memory controller deasserts its address bus grant for a single cycle in cycle 7 in FIG. 11D as opposed to the memory controller deasserting its address bus grant for a single cycle in cycle 8 in FIG. 11C. Of interest in FIG. 11D is that, based on the value of UR3 in cycle 9, the arbiter can decide in cycle 9 that a data bus grant may be given in cycle 10, as is shown. Again, this is significant as it can be seen in this scenario that the processor receives its data bus grant as many as nine cycles earlier in FIG. 11D to complete a paired address/data bus request as compared to the scenario in FIG. 11A.

Figure 12B:
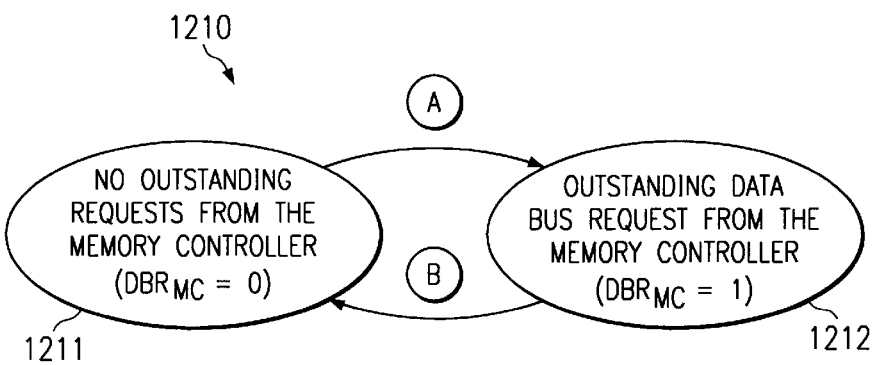
FIGS. 12A–12C show state diagrams for avoiding data bus grant starvation.
Figure 12A:
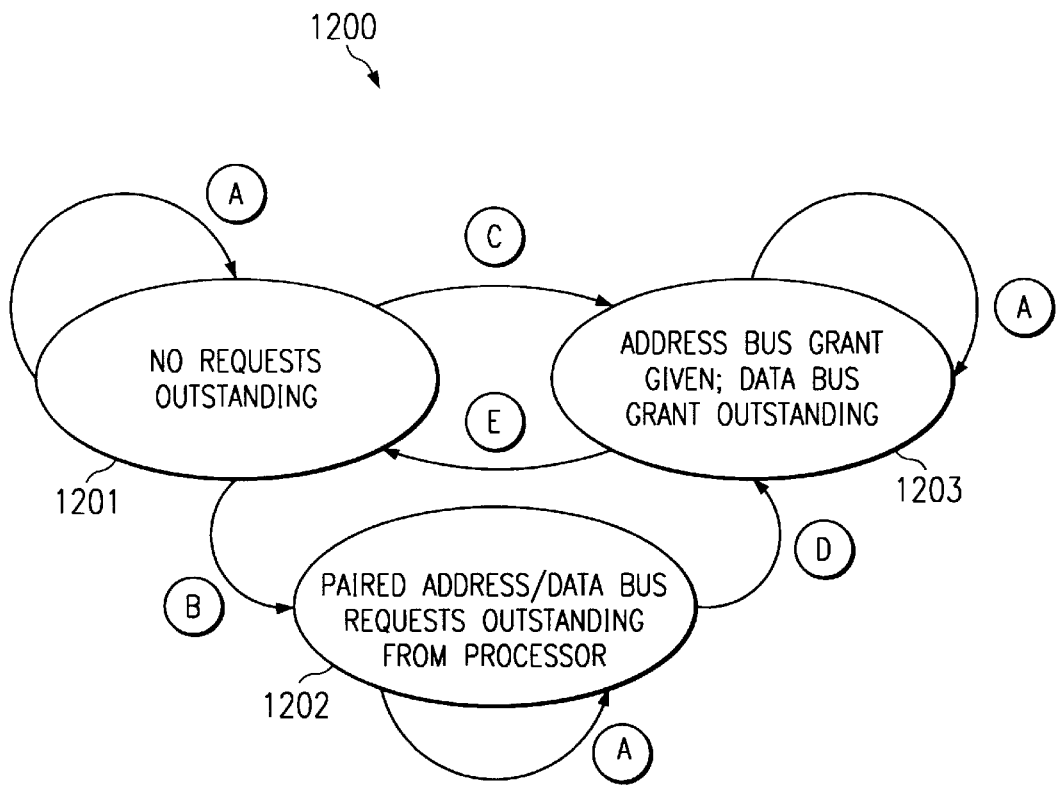
Figure 12C:
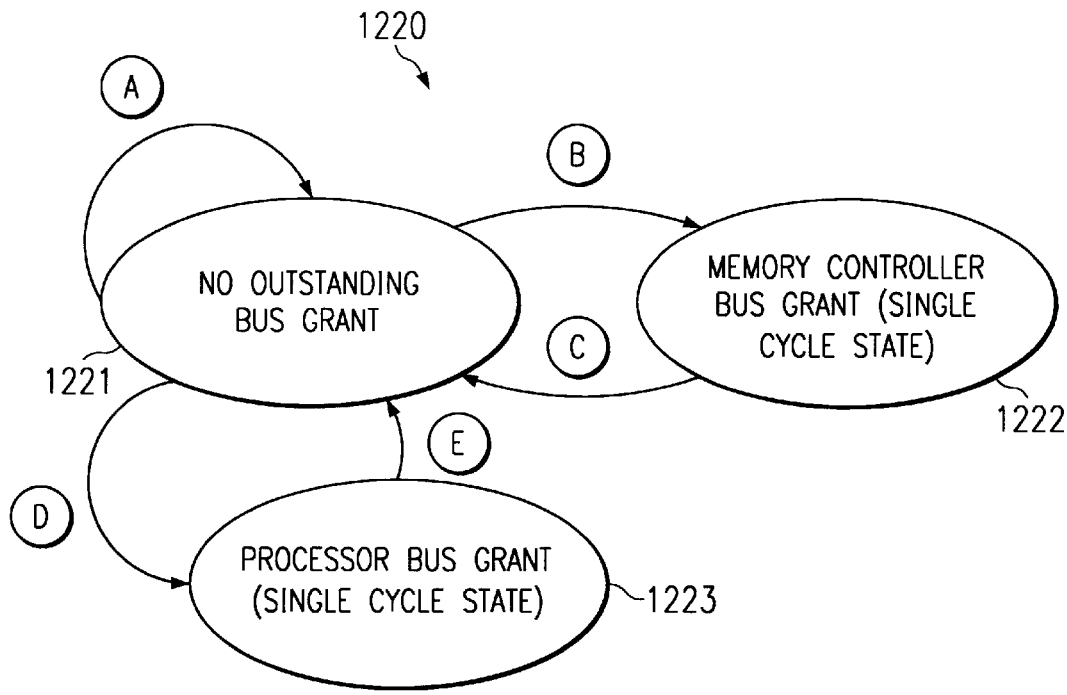

With reference to FIGS. 12A–12C, state diagrams depicts state machines for avoiding data bus grant starvation. FIG. 12A shows a state machine for a delayed data bus grant. FIG. 12B shows a state machine for determining an older request from the memory controller. FIG. 12C showns a state machine for a data bus arbiter using the state machines in FIG. 12A and FIG. 12B. In FIG. 12A, state machine 1200 has three states 1201–1203 as follows:

State 1201: No requests outstanding.

State 1202: Address and data bus requests outstanding from processor.

State 1203: Address bus grant given, data bus grant outstanding.

Normally, state machine 1200 remains in state 1201. When a paired address/data request comes from the processor, state machine 1200 moves to state 1202 if no previously unrequested grant, as described above with respect to FIGS. 11A–11C, has been given which could satisfy the address request. Once the address grant has been given or the toteboard described above indicates a grant has already been given which will satisfy the request, state 1203 is entered. The state machine returns to state 1201 when the data grant is given, i.e., there is no longer an outstanding request.

The priorities will be reversed to give the processor higher priority than the memory controller while state machine 1200 remains in state 1203. Another two-state state machine can override this reversal temporarily for one data bus grant if, at the time of the processor data bus request, the memory controller had an older data bus request outstanding. This ensures that the reversal of priorities does not cause undue unfairness to the memory controller.

In FIG. 12B, state machine 1210 has two states 1211–1212 as follows:

State 1211: No outstanding requests from the memory controller.

State 1202: Outstanding memory controller data bus request.

State 1202 is entered only if state machine 1200 described above is not in state 1203 when the memory controller requests the data bus. State 1211 is entered once the memory controller receives a data bus grant.

In FIG. 12C, state machine 1220 has three states 1221–1222 as follows:

State 1221: No outstanding bus grant.

State 1222: Memory controller bus grant (single cycle state).

State 1223: Processor bus grant (single cycle state).

State machine 1220 shows the manner in which a bus arbiter combines the logic of state machine 1200 in FIG. 12A and state machine 1210 in FIG. 12B into a three-state state machine in a data bus arbiter.

Conclusion

The advantages of the present invention should be apparent in view of the detailed description provided above. The present invention allows scaling of standardized and easier-to-verify bus-based cache-coherence protocols to a large-way, multiprocessor system whose large size normally would make physical buses inefficient media for communication among system components, such as processors, memory subsystems, and I/O agents. By using the distributed system structure of the present invention, development of more complicated directory-based protocols, etc. are unnecessary. The present invention also allows component interfaces to be clocked faster than possible with a single bus, thereby enhancing the bandwidths of the component interfaces and resulting in higher total system bandwidth and performance. The present invention also supports multiple data buses, thereby multiplying the data bandwidth of the system and improving the efficiency of the processor. The data transfer parallelism of the present system also improves total system data throughput.

An additional advantage provided by the present invention is that it may park the address bus towards an entity while providing an algorithm for looking up the last few address grants given to see if any of them could be used to satisfy the address request. If one of them qualifies, the data bus grant is given immediately, speeding up the data bus grant process by anywhere from one to many cycles depending on the requests for the address bus from another, higher priority requester.

It is important to note that while the present invention has been described in the context of a fully functioning data processing system, those of ordinary skill in the art will appreciate that the processes of the present invention are capable of being distributed in the form of a computer readable medium of instructions, including microcode, and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for controlling data transfer between memory controller and a master device by a bus arbiter in a multi-processor system wherein memory controller has higher priority that the master device, the method comprising the steps of:

granting an unrequested address bus grant to the master device;

in response to receiving an address bus request from the memory controller and an address bus request and data bus request from the master device, rescinding the unrequested address bus grant; and if the unrequested address bus grant occurred within a predetermined length of time before the data bus request, granting the data bus request to the master device wherein the unrequested address bus grant is converted to a requested address bus grant for the master device.

2. The method of claim 1 further comprising:

maintaining a grant history of unrequested address bus grants.

3. The method of claim 2, wherein the grant history has a length of a predefined number of cycles equal to a number of latches through which bus grants pass between the master device and the bus arbiter.

4. The method of claim 3 further comprising:

receiving a data bus request from the master device;

checking the grant history for an unrequested address bus grant within the previous predefined number of cycles; and in response to a determination that an unrequested address bus grant has been granted within the previous predefined number of cycles, granting immediately a data bus grant to the master device.

5. The method of claim 4 further comprising:

in response to a determination that an unrequested address bus grant has been granted within the previous predefined number of cycles, clearing a record of the unrequested address bus grant from the grant history.

6. The method of claim 1, wherein the bus arbiter is in a node controller.

7. The method of claim 6 wherein the multiprocessor system comprises:

the node controller;

a plurality of master devices; and a plurality of bidirectional master device buses, wherein a master device bus connects one or more master devices within a node to a port of the node controller.

8. The method of claim 7 wherein a node controller comprises:

a plurality of master device ports, wherein each master device port connects to a master device bus;

a pair of address switch ports, wherein each address switch port connects to one of a pair of unidirectional address switch buses, wherein one of the pair of address switch buses conveys an address from the node controller to the address switch and one of the pair of address switch buses conveys an address from the address switch to the node controller; and a plurality of memory subsystem ports, wherein each memory subsystem port connects to a bidirectional memory subsystem bus, wherein a memory subsystem bus conveys data between the node controller and one of the memory subsystems.

9. An apparatus for controlling data transfer between a memory controller and a master device by a bus arbiter in a multiprocessor system, wherein memory controller has higher priority that the master device, the apparatus comprising the steps of:

granting means for granting an unrequested address bus grant to the master device;

rescinding means for rescinding, in response to receiving an address bus request from the memory controller and an address bus request and data bus request from the master device, the unrequested address bus grant, and granting means for granting the data bus request to the master device if the unrequested address bus grant occurred within a predetermined length of time before the data bus request wherein the unrequested address bus grant is converted to a requested address bus grant for the master device.

10. The apparatus of claim 9 further comprising:

maintaining means for maintaining a grant history of unrequested address bus grants.

11. The apparatus of claim 10, wherein the grant history has a length of a predefined number of cycles equal to a number of latches through which bus grants pass between the master device and the bus arbiter.

12. The apparatus of claim 11 further comprising:

receiving means for receiving a data bus request from the master device;

checking means for checking the grant history for an unrequested address bus grant within the previous predefined number of cycles; and granting means for granting, in response to a determination that an unrequested address bus grant has been granted within the previous predefined number of cycles, immediately a data bus grant to the master device.

13. The apparatus of claim 12 further comprising:

clearing means for clearing, in response to a determination that an unrequested address bus grant has been granted within the previous predefined number of cycles, a record of the unrequested address bus grant from the grant history.

14. The apparatus of claim 9, wherein the bus arbiter is in a node controller.

15. The apparatus of claim 14 wherein the multiprocessor system comprises:

the node controller;

a plurality of master devices; and a plurality of bidirectional master device buses, wherein a master device bus connects one or more master devices within a node to a port of the node controller.

16. The apparatus of claim 15 wherein a node controller comprises:

a plurality of master device ports, wherein each master device port connects to a master device bus;

a pair of address switch ports, wherein each address switch port connects to one of a pair of unidirectional address switch buses, wherein one of the pair of address switch buses conveys an address from the node controller to the address switch and one of the pair of address switch buses conveys an address from the address switch to the node controller; and a plurality of memory subsystem ports, wherein each memory subsystem port connects to a bidirectional memory subsystem bus, wherein a memory subsystem bus conveys data between the node controller and one of the memory subsystems.

17. The apparatus of claim 16, wherein the node controller comprises a plurality of interrupt arbiters, and wherein each interrupt arbiter is uniquely associated with a master device port.

18. A computer program product in a computer-readable medium for controlling data transfer between a memory controller and a master device by a bus arbiter in a multiprocessor system, wherein memory controller has higher priority that the master device, the computer program product comprising:

instructions for granting an unrequested address bus grant to the master device;

instructions for rescinding, in response to receiving an address bus request from the memory controller and an address bus request and data bus request from the master device, the unrequested address bus grant; and instructions for granting the data bus request to the master device if the unrequested address bus grant occurred within a predetermined length of time before the data bus request wherein the unrequested address bus grant is converted to a requested address bus grant for the master device.

19. The computer program product of claim 18 further comprising:

instructions for maintaining a grant history of unrequested address bus grants.

20. The computer program product of claim 19, wherein the grant history has a length of a predefined number of cycles equal to a number of latches through which bus grants pass between the master device and the bus arbiter.

21. The computer program product of claim 20 further comprising:

instructions for receiving a data bus request from the master device; checking the grant history for an unrequested address bus grant within the previous predefined number of cycles; and instructions for immediately granting, in response to a determination that an unrequested address bus grant has been granted within the previous predefined number of cycles, a data bus grant to the master device.

22. The computer program product of claim 21 further comprising:

instructions for clearing in response to a determination that an unrequested address bus grant has been granted within the previous predefined number of cycles, a record of the unrequested address bus grant from the grant history.

23. The computer program product of claim 18, wherein the bus arbiter is in a node controller.

24. The computer program product of claim 23 wherein the multiprocessor system comprises:

the node controller;

a plurality of master devices; and a plurality of bidirectional master device buses, wherein a master device bus connects one or more master devices within a node to a port of the node controller.

25. The computer program product of claim 24 wherein a node controller comprises:

a plurality of master device ports, wherein each master device port connects to a master device bus;

a pair of address switch ports, wherein each address switch port connects to one of a pair of unidirectional address switch buses, wherein one of the pair of address switch buses conveys an address from the node controller to the address switch and one of the pair of address switch buses conveys an address from the address switch to the node controller; and a plurality of memory subsystem ports, wherein each memory subsystem port connects to a bidirectional memory subsystem bus, wherein a memory subsystem bus conveys data between the node controller and one of the memory subsystems.

26. A system for controlling data access between a memory controller and a master device by a bus arbiter in a multiprocessor system, wherein the memory controller has higher priority than the master device, the system comprising:

a bus arbiter for a bus connected to a master device and a node controller, wherein the bus arbiter parks the bus toward the master device;

a history of address bus grants;

wherein the history is used to determine whether one of a plurality of previous address bus grants within predetermined length of time can be used to satisfy an address bus request associated with a data bus request by the master device; and wherein if a previous address bus grant of the plurality can be used to satisfy the address bus request associated with the data bus request, giving the data bus grant immediately.

27. A method of arbitrating bus access between a memory controller and a master device, wherein the memory controller has higher priority tan the master device, comprising the steps of:

granting an unrequested address bus grant to the master device;

in response to receiving an address bus request from the memory controller, rescinding the unrequested address bus grant; and if the unrequested address bus grant existed within a predetermined amount of time prior to receiving a data bus request from the mast device, granting the data bus to the master device wherein the unrequested address bus grant is converted to a requested address bus grant for the master device.

28. The method of claim 27, wherein a history of unrequested address bus grants to the master device is retained.

29. The method of claim 28, wherein the history is retained for a number of clock cycles equal to one less than the number of latches rough which requests and grants must pass.

30. A method of controlling data transfer between a memory controller and a master device by a bus arbiter, wherein the memory controller has higher priority than the master device, comprising the steps of:

storing a history of unrequested address bus grants;

when an unrequested address bus grant is given within a preconfigured number of cycles prior to a coupled address and data bus request satisfying the address bus request portion of the coupled address and data bus request by using the unrequested address bus grant.

* * * * *

UNITED STATES PATENT AND TRADEMARK OFFICE
CERTIFICATE OF CORRECTION

PATENT NO. : 6,535,941 B1  Page 1 of 1
DATED : March 18, 2003
INVENTOR(S) : Kruse It is certified that error appears in the above-identified patent and that said Letters Patent is hereby corrected as shown below:

<u>Column 29,</u>
Line 24, after "priority", delete "tan" and insert -- than --.

<u>Column 30,</u>
Line 5, after "latches", delete "rough" and insert -- through --.
Line 6, after "from the", delete "mast" and insert -- master --.
Line 23, after "bus", delete "request" and insert -- request, --.

Signed and Sealed this

Twenty-third Day of September, 2003

JAMES E. ROGAN
*Director of the United States Patent and Trademark Office*